United States Patent [19]

Emoto et al.

[11] Patent Number: 5,041,349
[45] Date of Patent: Aug. 20, 1991

[54] ELECTROPHOTOGRAPHIC DISAZO PHOTORECEPTOR

[75] Inventors: Kazuhiro Emoto; Kozo Haino; Akira Itoh; Makoto Okaji, all of Nagaokakyo, Japan

[73] Assignee: Mitsubishi Paper Mills, Limited, Tokyo, Japan

[21] Appl. No.: 560,736

[22] Filed: Jul. 31, 1990

Related U.S. Application Data

[63] Continuation of Ser. No. 260,140, Oct. 20, 1988, abandoned.

[30] Foreign Application Priority Data

Feb. 4, 1988 [JP] Japan .................. 63-25437
Feb. 8, 1988 [JP] Japan .................. 63-28335

[51] Int. Cl.$^5$ .................. G03G 5/06; G03G 5/047
[52] U.S. Cl. .................. 430/58; 430/59; 430/76; 430/77; 430/78; 430/79
[58] Field of Search .................. 430/58, 59, 76, 77, 430/78, 79

[56] References Cited

U.S. PATENT DOCUMENTS 4,619,881 10/1986 Makino et al. .................. 430/58 X

FOREIGN PATENT DOCUMENTS 59-229564 12/1984 Japan .................. 430/58
62-251753 11/1987 Japan .................. 430/76
63-89866 4/1988 Japan .................. 430/76

*Primary Examiner*—Roland Martin
*Attorney, Agent, or Firm*—Cushman, Darby & Cushman

[57] ABSTRACT

This invention provides an electrophotographic photoreceptor which is high in durability and high in sensitivity. This photoreceptor comprises an electroconductive support and, provided thereon, a photosensitive layer containing an azo pigment represented by the following formula [I] or [II]:

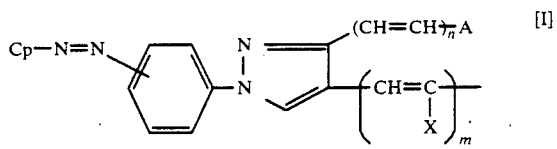

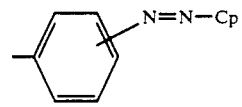

wherein A represents a hydrogen atom, an alkyl group, a phenyl group or a heterocyclic ring group, m and n each represents 0 or 1, X represents a hydrogen atom, a lower alkyl group, a cyano group or a halogen atom and Cp represents a coupler residue, or

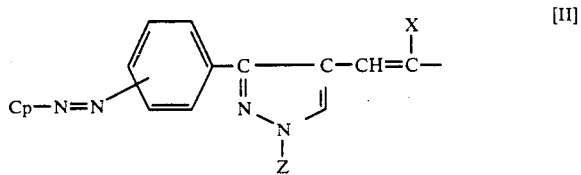

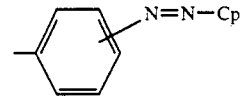

wherein Z represents an alkyl group, a phenyl group or a heterocyclic ring group, X represents a hydrogen atom, a lower alkyl group, a cyano group or a halogen atom and Cp represents a coupler residue.

16 Claims, No Drawings

ELECTROPHOTOGRAPHIC DISAZO PHOTORECEPTOR

This is a continuation of application Ser. No. 07/260,140, filed Oct. 20, 1988, now abandoned.

BACKGROUND OF THE INVENTION

This invention relates to an electrophotographic photoreceptor and, particularly, to a novel electrophotographic photoreceptor having a photosensitive layer containing an azo pigment. More particularly, it relates to a highly durable electrophotographic photoreceptor high in sensitivity and suitable for repeated use.

Hitherto, there have been widely known those having a photosensitive layer mainly composed of inorganic photoconductive materials such as selenium, zinc oxide and cadmium sulfide.

However, these photoreceptors are not necessarily satisfactory in sensitivity, thermal stability, moisture resistance and durability. Especially, the toxicity of selenium and cadmium sulfide imposes some restriction on their manufacture and handling.

On the other hand, recently, electrophotographic photoreceptors having a photosensitive layer mainly composed of an organic photoconductive compound have attracted much attention because of the ease of their manufacture and thermal stability superior to the selenium photoreceptors.

A well known organic photoconductive compound is poly-N-vinylcarbazole. However, an electrophotographic photoreceptor having a photosensitive layer mainly composed of a charge transfer complex formed from the poly-N-vinylcarbazole and a Lewis acid such as 2,4,7-trinitro-9-fluorenone is not necessarily satisfactory in sensitivity and durability.

Photoreceptors of functionally separated type such as a laminated type and a dispersion type, in which the carrier generating function and the carrier transfer function are respectively borne by different substances have advantages that the materials can be selected from a wide range and thus electrophotographic photoreceptors having any of characteristics such as charge characteristic, sensitivity and durability can be relatively easily produced.

Hitherto, various carrier generating materials and carrier transfer materials have been proposed.

For example, electrophotographic receptors have been put to practical use which has a photosensitive layer comprising a combination of a carrier generating layer comprising amorphous selenium and a carrier transfer layer mainly composed of poly-N-vinylcarbazole. However, the carrier generating layer comprising amorphous selenium is inferior in durability.

Furthermore, use of organic dyes and pigments as a carrier generating material has been proposed and, for example, electrophotographic photoreceptors containing monoazo pigment or bisazo pigment in the photosensitive layer are disclosed in Japanese Patent Kokoku No. 48-30513, Japanese Patent Kokai Nos. 52-4241 and 54-46558 and Japanese Patent Kokoku No. 56-11945. However, these azo pigments are not completely satisfactory in sensitivity, residual potential and stability in repeated use and besides, scope of selection of carrier transfer materials is limited. Thus, the fact is that there are no electrophotographic photoreceptors which fully meet a wide variety of requirements of the electrophotographic process.

SUMMARY OF THE INVENTION

An object of this invention is to provide an electrophotographic photoreceptor containing an azo pigment which is stable against heat and light and is excellent in carrier generating ability.

Another object of this invention is to provide an electrophotographic photoreceptor high in sensitivity, small in residual potential and excellent in durability, these properties being unaffected by repeated use.

Still another object of this invention is to provide an electrophotographic photoreceptor which contains an azo pigment capable of effectively functioning as carrier generating material even in combination with a wide variety of carrier transfer materials.

DESCRIPTION OF THE INVENTION

As a result of the inventors' intensive research, it has been found that the azo pigments represented by the following formula [I] or [II] can serve as effective component of photoreceptors. This invention is based on this finding.

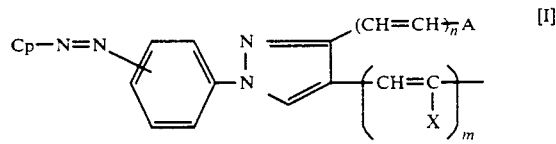

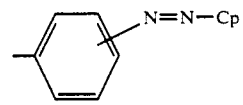

wherein A represents a hydrogen atom, an alkyl group, a phenyl group or a hetrocyclic group, m and n each represents 0 or 1, X represents a hydrogen atom, a lower alkyl group, a cyano group or a halogen atom and Cp represents a coupler residue.

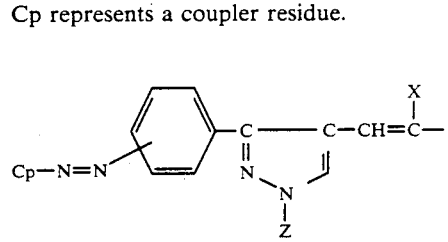

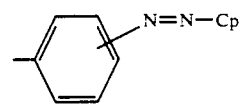

wherein Z represents an alkyl group, a phenyl group or a heterocyclic group, X represents a hydrogen atom, a lower alkyl group, a cyano group or a halogen atom and Cp represents a coupler residue.

Cp represents a residue of a coupler which reacts with diazo group and especially effective coupler residues are as shown by the following formula (III).

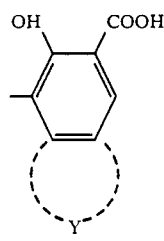 (III-a)

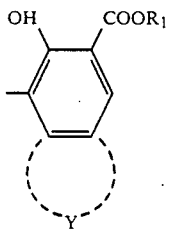 (III-b)

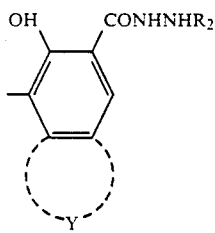 (III-c)

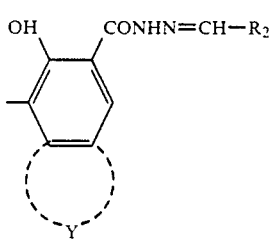 (III-d)

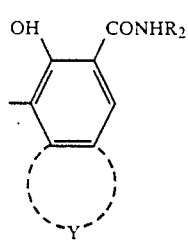 (III-e)

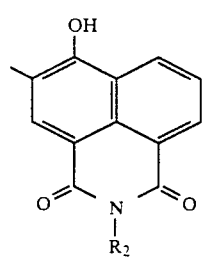 (III-f)

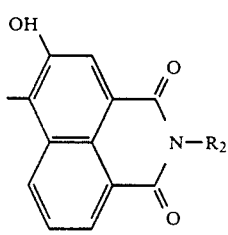 (III-g)

-continued

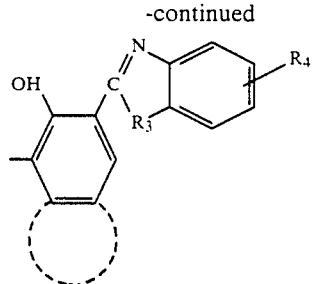 (III-h)

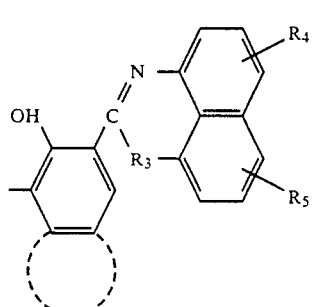 (III-i)

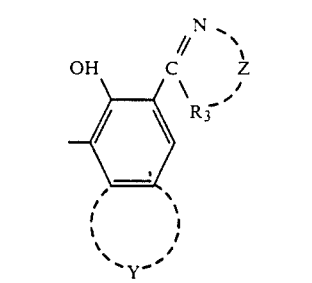 (III-j)

[wherein Y represents a group of atoms necessary to form a polycyclic aromatic ring such as, for example, naphthalene or anthracene ring by condensation with a benzene ring or to form a heterocyclic ring such as, for example, carbazole ring, benzocarbazole ring or dibenzofuran ring by condensation with benzene ring; $R_1$ represents an alkyl group which may be substituted (e.g., methyl, ethyl, n-propyl, iso-propyl, n-butyl, sec-butyl, amyl, l-octyl, benzyl, p-chlorobenzyl, 3,4-dichlorobenzyl, p-methylbenzyl, 2-phenylethyl, α-naphthylmethyl and β-naphthylmethyl) or an aryl group which may be substituted (e.g., phenyl, tolyl, xylyl, biphenyl, chlorophenyl, dichlorophenyl, bromophenyl, methoxyphenyl, ethoxyphenyl, butoxyphenyl, phenoxyphenyl, nitrophenyl, cyanophenyl, hydroxyphenyl, carboxyphenyl, N,N-dimethylaminophenyl, α,α,α-trifluoromethylphenyl, methylthiophenyl, α-naphthyl and β-naphthyl); $R_2$ represents the same group as for $R_1$ or a heterocyclic group (e.g., thiazolyl, 5-nitrothiazolyl, carbazolyl, indolyl, pyrrolyl, acridyl, benzo(b)thiophenyl, benzoinimidazolyl, oxazolyl, chloroxazolyl, triazolyl, piperidyl, pyridyl and quinolyl); $R_3$ represents O, S or —NH—, $R_4$ and $R_5$ each represents a hydrogen atom, an alkyl which may be substituted, a nitro group, a methoxy group, an ethoxy group, an acetyl group, a cyano group or a halogen atom; and Z represents a chain hydrocarbon group necessary to form a 5- or 6-membered ring].

That is, according to this invention, an electrophotographic photoreceptor which is excellent in film properties and electrophotographic characteristics such as charge retention, sensitivity and residual potential, is susceptible to little deterioration due fatigue after repeated use, shows no change in said characteristics against exposure to heat and light and thus can exhibit stable characteristics can be produced by using the azo pigment represented by the above formula [I] or [II] as a photoconductive material in a photosensitive layer of the electrophotographic photoreceptor and as a carrier generating material of the functionally separated type, in which generation and transfer of carrier are performed by different materials by utilizing only the superior carrier generating ability of the azo pigment.

Examples of the azo pigments represented by the above formulas and useful in this invention include those which have the following structural formulas, but this invention is not limited thereto.

Examples of azo pigments of the formula [I]:

| Azo pigment | X | A | n | Cp |
|---|---|---|---|---|
| I-1 | H | H | 0 | 3-hydroxy-N-phenyl-2-naphthamide (methyl-substituted) |
| I-2 | H | H | 1 | 3-hydroxy-N-(3-chlorophenyl)-anthracene-carboxamide (methyl-substituted) |
| I-3 | H | —CH$_3$ | 0 | 3-hydroxy-2-(benzothiazol-2-yl)naphthalene (methyl-substituted) |
| I-4 | H | —CH$_3$ | 0 | hydroxy-N-phenyl-carbazole-naphthamide |
| I-5 | H | —C$_2$H$_5$ | 0 | 3-hydroxy-N-benzylidene-2-naphthohydrazide (methyl-substituted) |
| I-6 | H | —C$_2$H$_5$ | 0 | hydroxy-N-(3-trifluoromethylphenyl)-carbazole-naphthamide |

-continued
| | | | | |
|---|---|---|---|---|
| I-7 | H | -nC₃H₇ | 0 | 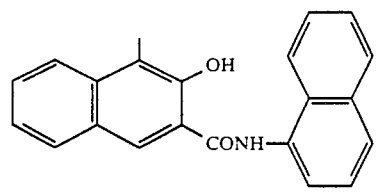 |
| I-8 | H | -nC₄H₉ | 0 | 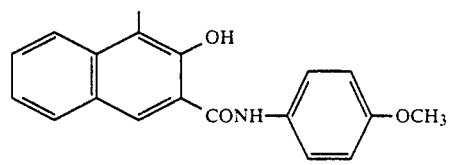 |
| I-9 | H | —CH₂Cl | 0 | 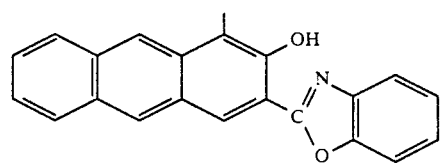 |
| I-10 | H | —CHClH₃ | 0 | 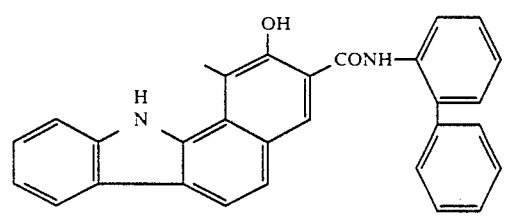 |
| I-11 | H | —CHClCH₃ | 0 | 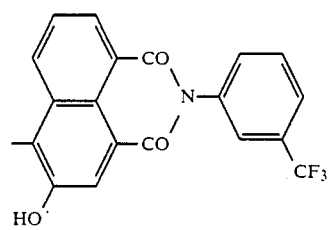 |
| I-12 | H | 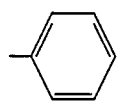 | 0 | 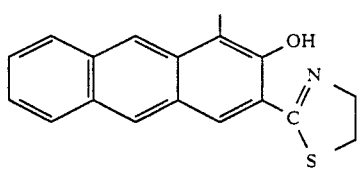 |
| I-13 | H | 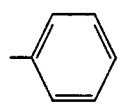 | 0 | 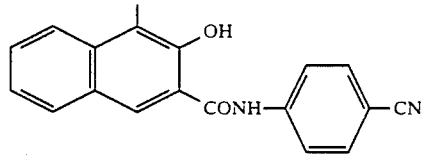 |
| I-14 | H | 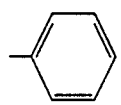 | 1 | 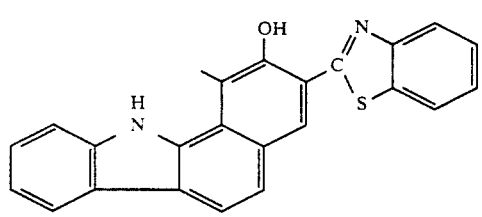 |
Examples of azo pigments of the formula [I]:

-continued

| | | Examples of azo pigments of the formula [I]: | | |
|---|---|---|---|---|
| I-15 | H | 4-methylphenyl | 0 | 4-hydroxy-methylnaphthalene-1,8-dicarboximide N-(4-cyanophenyl) |
| I-16 | H | 4-chlorophenyl | 1 | 4-methyl-3-hydroxy-2-naphthoic acid 4-chlorophenyl ester |
| I-17 | H | 4-cyanophenyl | 0 | 4-methyl-3-hydroxyanthracene-2-carboxamide N-n-dodecyl |
| I-18 | H | phenyl | 1 | carbazole-fused methyl-hydroxy-carboxamide N-(4-chlorophenyl) |
| I-19 | H | 3-methoxyphenyl | 0 | 4-methyl-3-hydroxy-2-naphthoamide N-(4-biphenyl) |
| I-20 | H | 4-pyridyl | 0 | 4-methyl-3-hydroxy-2-naphthoamide N-[4-(4-chlorophenylazo)phenyl] |
| I-21 | H | cyclohexanone | 0 | dibenzofuran-carboxamide N-(2,4-dichlorophenyl), hydroxy, methyl |
| I-22 | H | cyclohexanone | 0 | carbazole-fused benzo[a]naphtho hydroxy-methyl-carboxamide N-(3-cyanophenyl) |
| I-23 | H | furyl | 0 | 4-methyl-3-hydroxyanthracene-2-yl (4,5-dichloro-1,3-thiazol-2-yl) |

-continued
| | | Examples of azo pigments of the formula [I]: | | |
|---|---|---|---|---|
| I-24 | —CN | 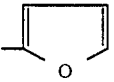 | 1 | 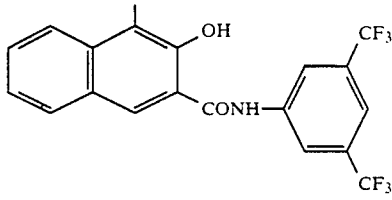 |
| I-25 | —CN | —CH₃ | 0 | 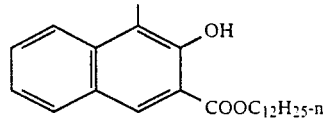 |
| I-26 | —CN | —C₂H₅ | 0 | 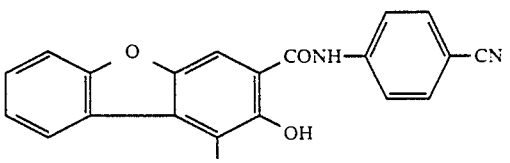 |
| I-27 | —CN | 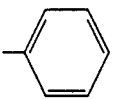 | 0 | 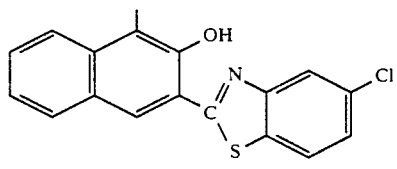 |
| I-28 | —CN | 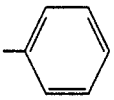 | 1 | 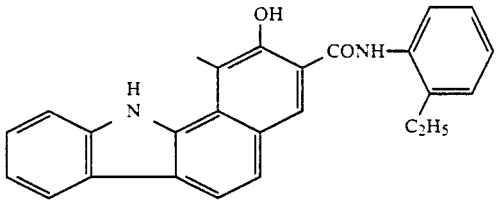 |
| I-29 | —CN | 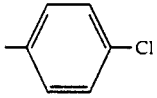 | 0 | 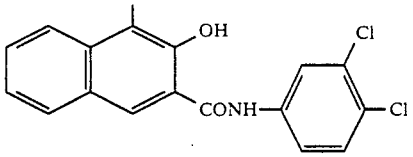 |
| I-30 | —CN | 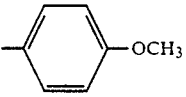 | 0 | 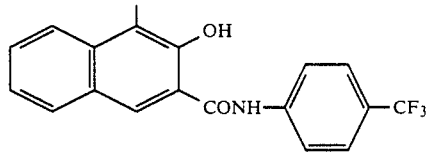 |
| I-31 | —CN | 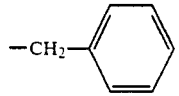 | 0 | 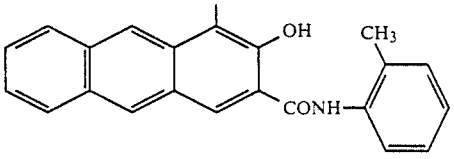 |

-continued
| | | | | |
|---|---|---|---|---|
| | | Examples of azo pigments of the formula [I]: | | |
| I-32 | —CN | 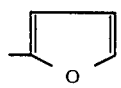 | 1 | 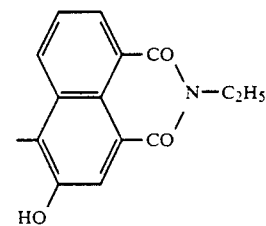 |
| I-33 | —CN | 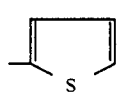 | 0 | 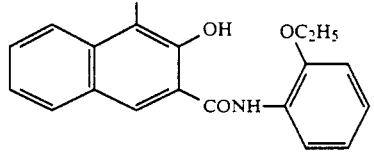 |
| I-34 | —CN | 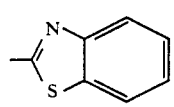 | 0 | 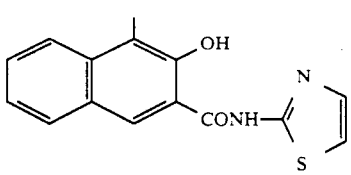 |
| I-35 | —CH$_3$ | —C$_2$H$_5$ | 0 | 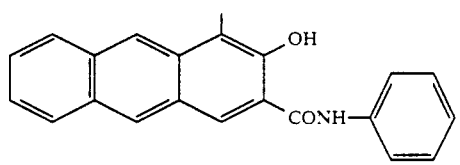 |
| I-36 | —CH$_3$ | 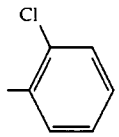 | | 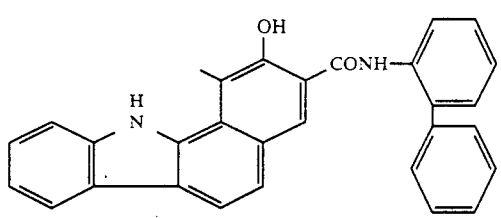 |
| I-37 | —CH$_3$ | 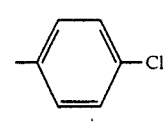 | | 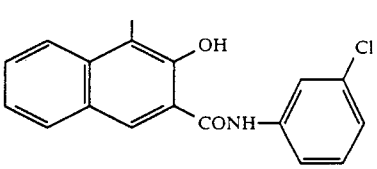 |
| I-38 | —CH$_3$ | 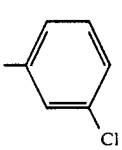 | | 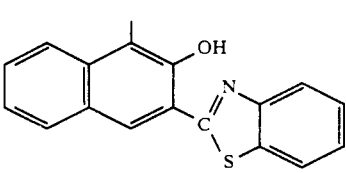 |
| I-39 | —Cl | 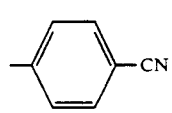 | | 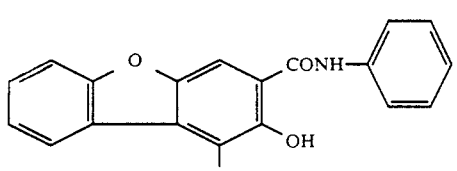 |

-continued
Examples of azo pigments of the formula [I]:
| | | | | |
|---|---|---|---|---|
| I-40 | —Cl | H | | 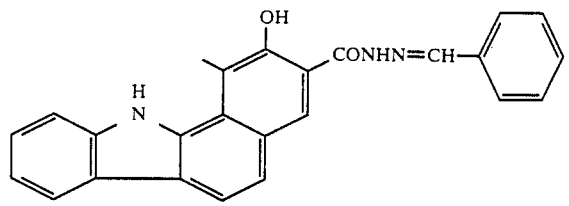 |
| I-41 | —Br | H | 0 | 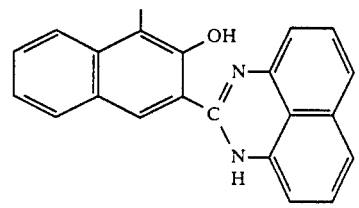 |
| I-42 | —Br | 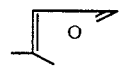 | 0 | 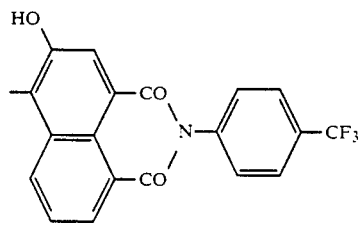 |
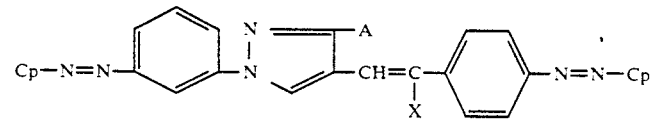
| Azo pigment | X | A | Cp |
|---|---|---|---|
| I-43 | H | H | 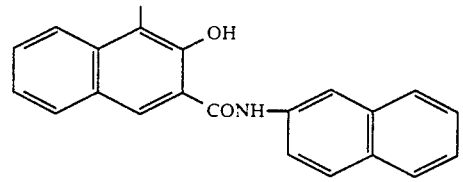 |
| I-44 | H | 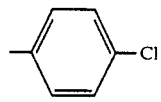 | 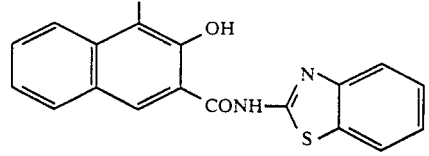 |
| I-45 | H | 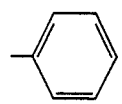 | 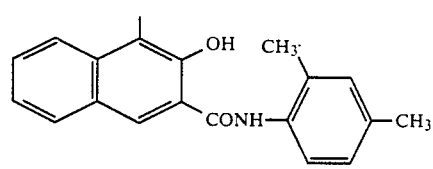 |
| I-46 | H | 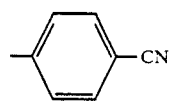 | 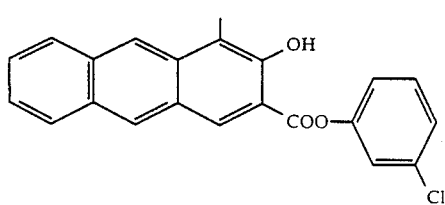 |

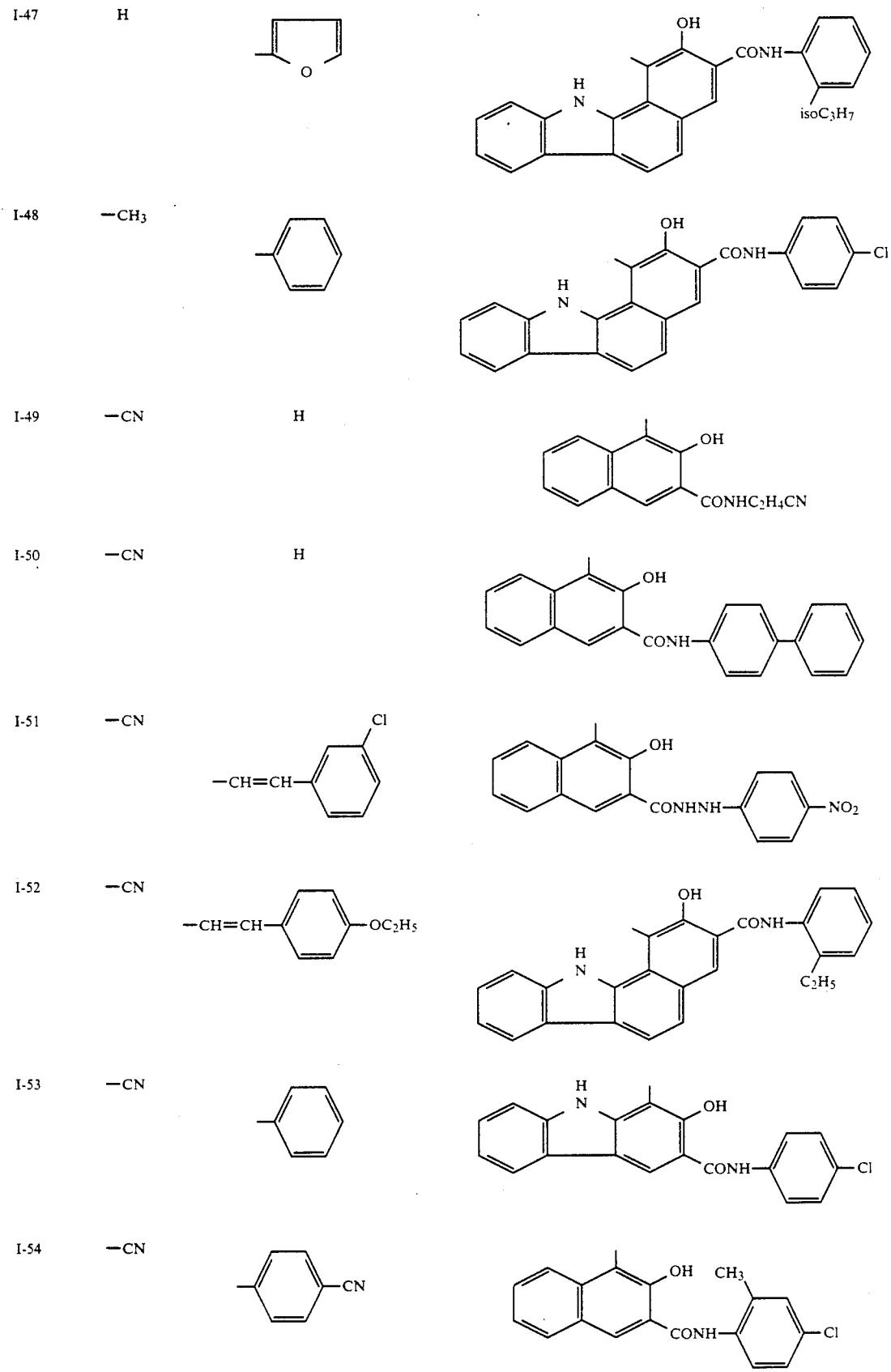

-continued
Examples of azo pigments of the formula [I]:
| I-55 | —Cl | H | (structure) |
| I-56 | —Cl | (4-chlorophenyl) | (structure) |
| I-57 | —Cl | —CH=CH—phenyl | (structure) |
| I-58 | —Br | H | (structure) |
| I-59 | —Br | (phenyl) | (structure) |
| I-60 | —I | —C₂H₅ | (structure) |
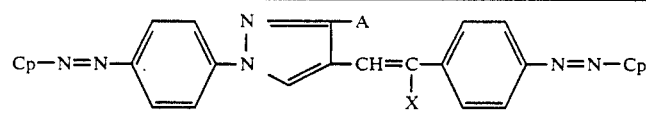
| Azo pigment | X | A | Cp |
|---|---|---|---|
| I-61 | H | H | (structure) |
| I-62 | H | —C₂H₅ | (structure) |

-continued
Examples of azo pigments of the formula [I]:
| | | | |
|---|---|---|---|
| I-63 | H | 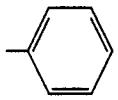 | 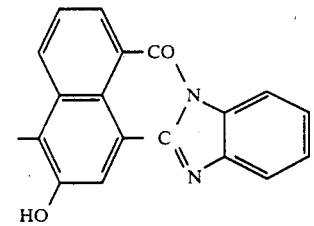 |
| I-64 | —CN | 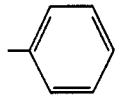 | 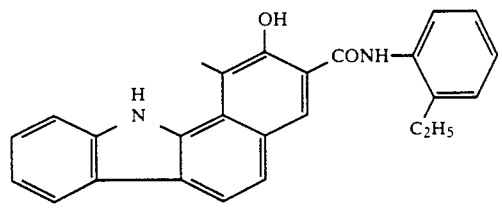 |
| I-65 | —CN | 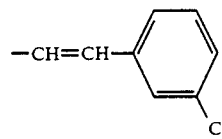 | 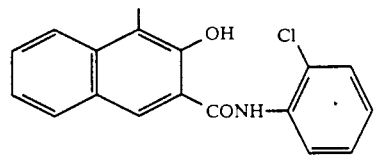 |
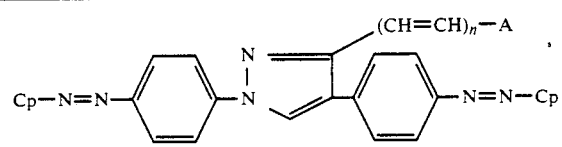
| Azo pigment | A | n | Cp |
|---|---|---|---|
| I-66 | H | 0 | 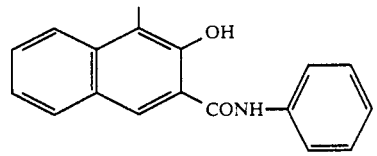 |
| I-67 | H | 1 | 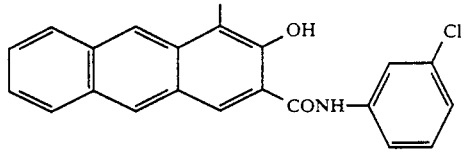 |
| I-68 | —CH$_3$ | 0 | 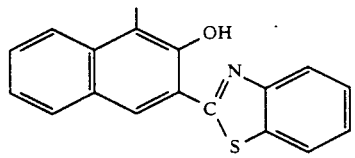 |
| I-69 | —CH$_3$ | 0 | 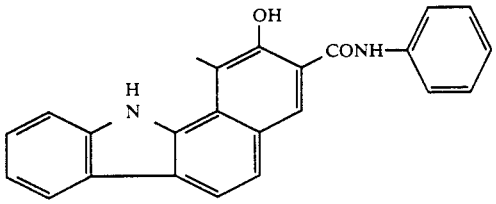 |

-continued

Examples of azo pigments of the formula [I]:

| | | | |
|---|---|---|---|
| I-70 | —$C_2H_5$ | 0 | (naphthalene with CH₃, OH, CONHN=CH-phenyl) |
| I-71 | —$C_2H_5$ | 0 | (carbazole-fused naphthol with CH₃, OH, CONH-phenyl-3-CF₃) |
| I-72 | -$nC_3H_9$ | 0 | (naphthalene with CH₃, OH, CONH-1-naphthyl) |
| I-73 | -$nC_4H_9$ | 0 | (naphthalene with CH₃, OH, CONH-phenyl-4-OCH₃) |
| I-74 | —$CH_2Cl$ | 0 | (anthracene-fused naphthol with CH₃, OH, benzoxazole) |
| I-75 | —$CHClCH_3$ | 0 | (carbazole-fused naphthol with CH₃, OH, CONH-biphenyl) |
| I-76 | —$CHClCH_3$ | 0 | (naphthalene dicarboximide with CH₃, OH, N-phenyl-3-CF₃) |
| I-77 | (phenyl) | 0 | (anthracene-fused naphthol with CH₃, OH, CONH-phenyl) |

-continued
Examples of azo pigments of the formula [I]:
| | | | |
|---|---|---|---|
| I-78 | 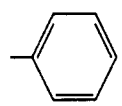 | 0 | 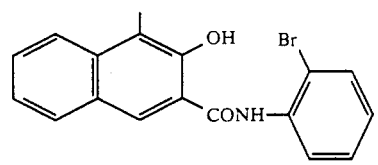 |
| I-79 | 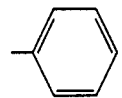 | 1 | 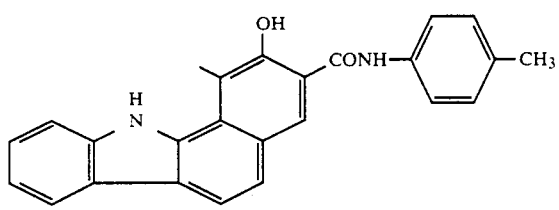 |
| I-80 | 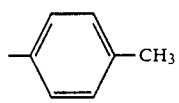 | 0 | 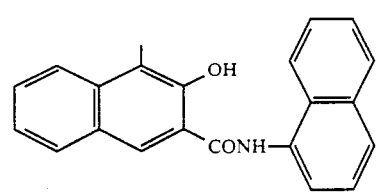 |
| I-81 | 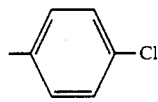 | 1 | 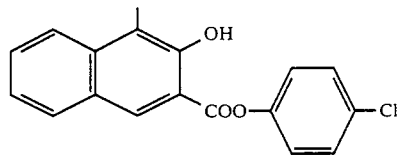 |
| I-82 | 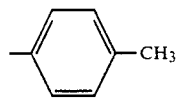 | 0 | 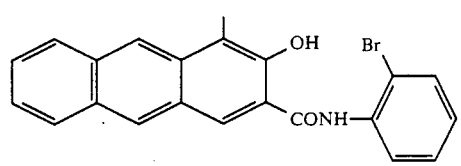 |
| I-83 |  | 1 | 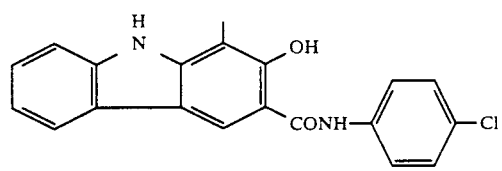 |
| I-84 | 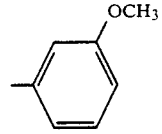 | 0 | 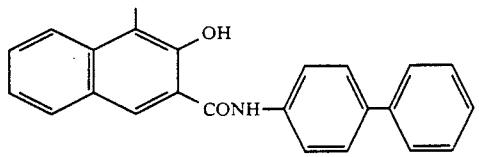 |
| I-85 | 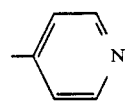 | 0 | 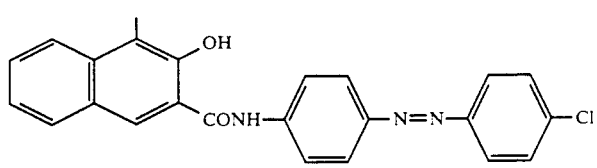 |

-continued

Examples of azo pigments of the formula [I]:

| | | | |
|---|---|---|---|
| I-86 | (2-methylcyclohexanone structure) | 0 | (dibenzofuran-OH-CONH-2,4-dichlorophenyl structure) |
| I-87 | (2-methylcyclohexanone structure) | 0 | (methyl-OH-benzo[carbazole]-CONH-phenyl structure) |
| I-88 | (2-methylfuran structure) | 0 | (methyl-OH-anthracene-C(=N-)-S- with 1,2-dichlorovinyl structure) |
| I-89 | (2-methylfuran structure) | 1 | (methyl-OH-naphthalene-CONH-3,5-bis(trifluoromethyl)phenyl structure) |

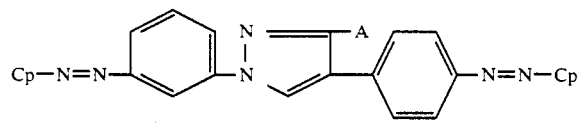

| Azo pigment | A | Cp |
|---|---|---|
| I-90 | H | (methyl-OH-naphthalene-CONH-2-naphthyl structure) |
| I-91 | (4-chlorophenyl) | (methyl-OH-naphthalene-CONH-benzothiazol-2-yl structure) |
| I-92 | (1-naphthyl) | (methyl-OH-naphthalene-CONH-2,4-dimethylphenyl structure) |

Examples of azo pigments of the formula [I]:
| | | |
|---|---|---|
| I-93 | 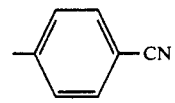 | 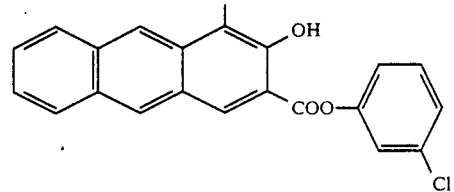 |
| I-94 | 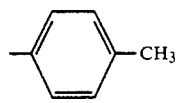 | 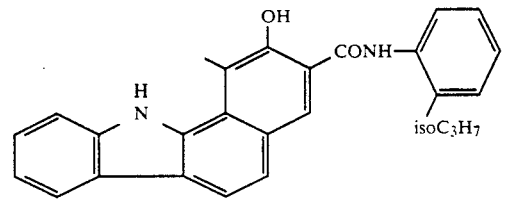 |
| I-95 | 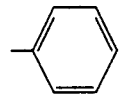 | 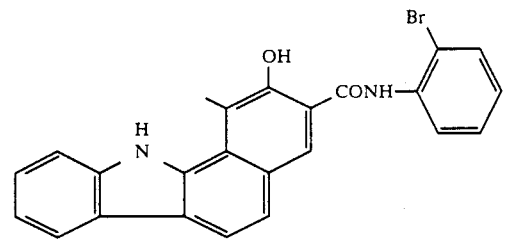 |
| I-96 | H | 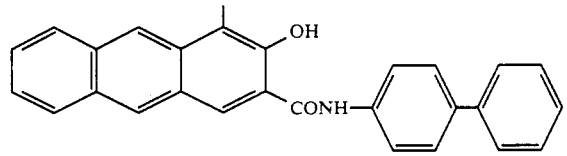 |
| I-97 | 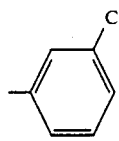 | 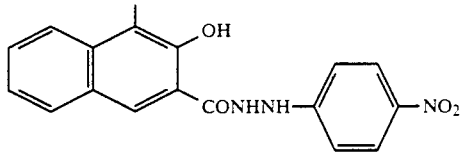 |
| I-98 | 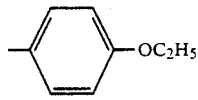 | 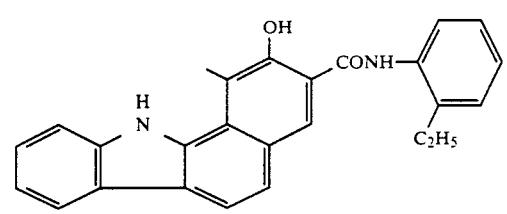 |
| I-99 | 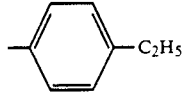 | 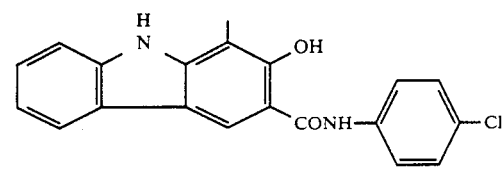 |
| I-100 | 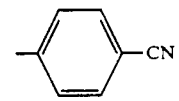 | 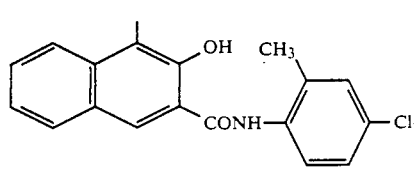 |

-continued
Examples of azo pigments of the formula [I]:

| | | |
|---|---|---|
| I-101 | H | 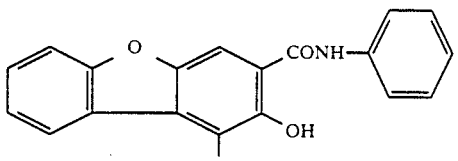 |
| I-102 | 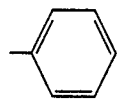 | 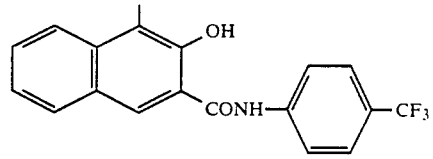 |
| I-103 | H | 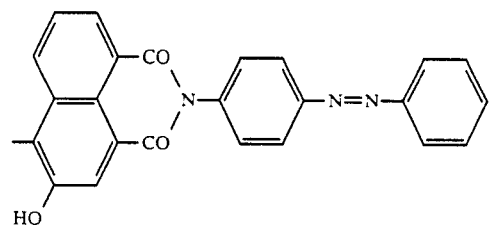 |
| I-104 | 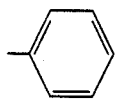 | 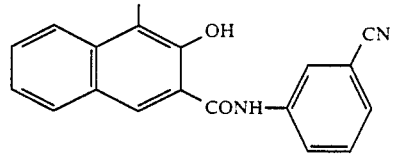 |

Among the azo pigments represented by the above formula [I], those represented by the following formula [I-A] have the maximum spectral sensitivity in the region of about 500 nm–about 600 nm and the sensitivity is sharply cut off on longer wavelength side. Therefore, they are excellent in reproducibility of red color of the original and besides, have high sensitivity and low residual potential and excellent in preexposure characteristics and characteristics after repeated use as photoreceptors used in electrophotographic copier with a halogen lamp as a light source.

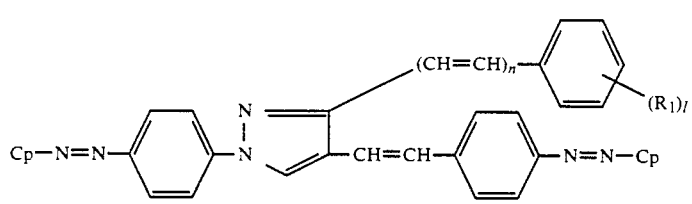

[I-A]

(wherein $R_1$ represents a hydrogen atom, a lower alkyl group, a lower alkoxy group or a halogen atom; Cp represents

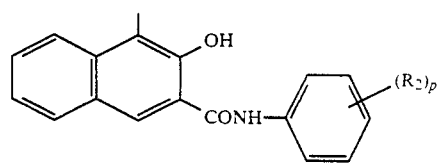

$R_2$ represents a hydrogen atom, a lower alkyl group, a lower alkoxy group or a halogen atom; n represents 0 or 1, l and p each represents 1 or 2 and when l and p are 2 the two $R_1$ and the two $R_2$ may be identical or different, respectively.

Examples of the azo pigments represented by the formula [I-A] are as follows:

Examples of the pigments of the formula [I-A]

| Azo pigment | $R_1$ | $R_2$ | n |
|---|---|---|---|
| I-105 | H | (2)-Cl | 0 |
| I-106 | H | (2)-Br | 0 |
| I-107 | (4)-CH$_3$ | (2)-Br | 0 |
| I-108 | (4)-C$_2$H$_5$ | (2)-Br | 0 |
| I-109 | H | (2)-CH$_3$ | 0 |
| I-110 | (4)-CH$_3$ | (4)-Cl | 1 |
| I-111 | (2)-CH$_3$ (4)-CH$_3$ | (2)-Br | 0 |
| I-112 | (4)-C$_2$H$_5$ | H | 1 |
| I-113 | (4)-Cl | (3)-Cl (4)-Cl | 0 |
| I-114 | (4)-CH$_3$ | (2)-CH$_3$ | 0 |
| I-115 | (3)-OCH$_3$ | H | 1 |
| I-116 | H | H | 1 |
| I-117 | (4)-CH$_3$ | (2)-CF$_3$ | 0 |

| Examples of the pigments of the formula [I-A] | | | |
|---|---|---|---|
| Azo pigment | R₁ | R₂ | n |
| I-118 | (2)-Br | H | 0 |
| I-119 | (4)-Br | (2)-C₂H₅ | 0 |
| I-120 | (4)-C₂H₅ | (2)-CH₃ | 1 |
| I-121 | (4)-CH₃ | (2)-Br (4)-Br | 0 |
| I-122 | H | (2)-Cl | 0 |
| I-123 | | (4)-CH₃ (2)-CH₃ (4)-CH₃ | 0 |
| I-124 | (2)-CH₃ (4)-Cl | (2)-Cl | 0 |
Examples of azo pigments of the formula [II]:
| Azo pigment | Z | X | Cp |
|---|---|---|---|
| II-1 | 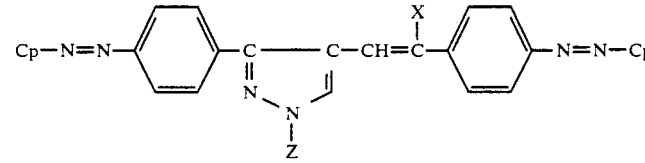 | H | 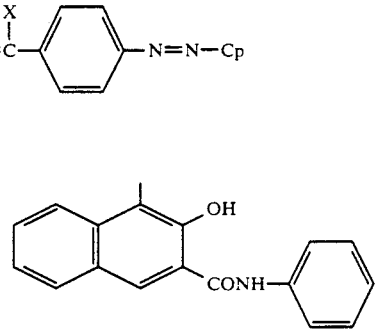 |
| II-2 | 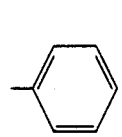 | H | 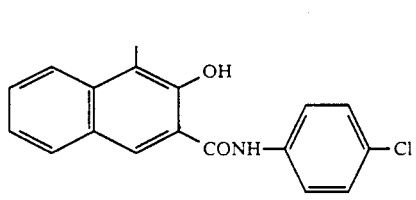 |
| II-3 | 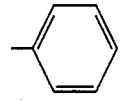 | H | 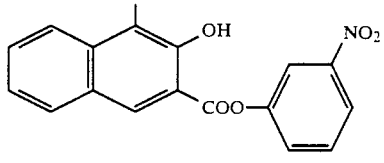 |
| II-4 | 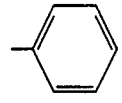 | H | 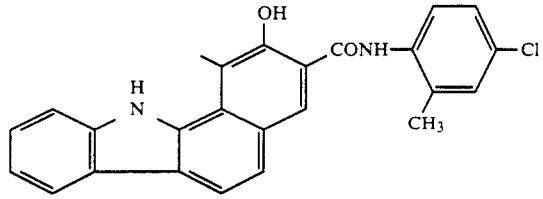 |
| II-5 | 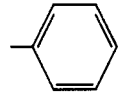 | Cl | 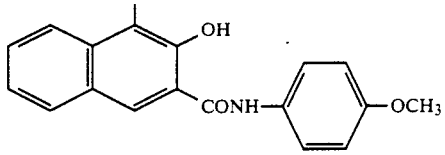 |
| II-6 | 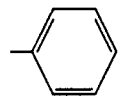 | Cl | 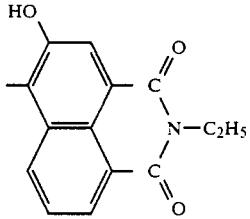 |

-continued
Examples of azo pigments of the formula [II]:
| Azo pigment | Z | X | Cp |
|---|---|---|---|
| II-7 | 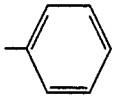 | —CH₃ | 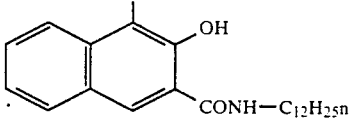 |
| II-8 | 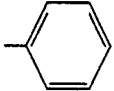 | —CN | 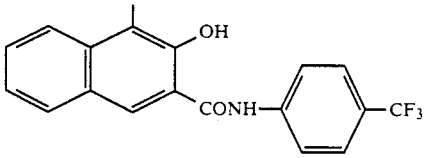 |
| II-9 | 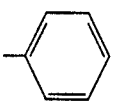 | —CN | 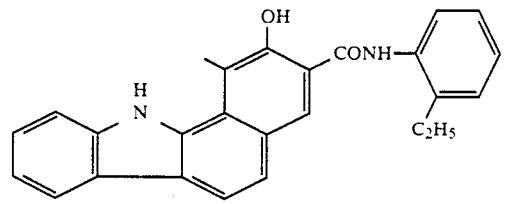 |
| II-10 | 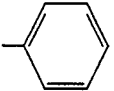 | —CN | 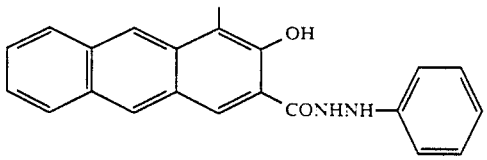 |
| II-11 | 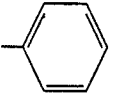 | —CN | 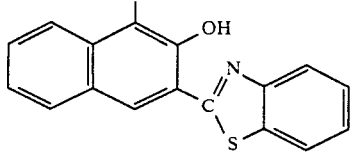 |
| II-12 | 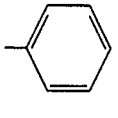 | —CN | 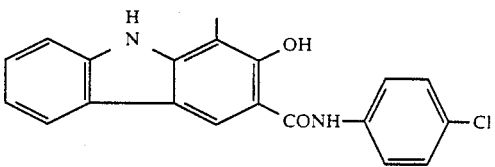 |
| II-13 | 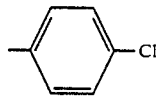 | H | 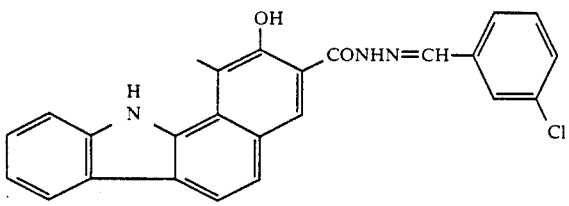 |
| II-14 | 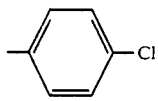 | H | 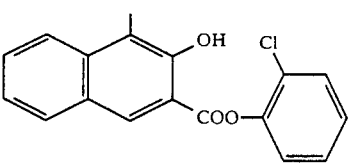 |

-continued

| Azo pigment | Z | X | Cp |
|---|---|---|---|
| II-15 | 3-Cl-C₆H₄– | H | 4-methyl-3-hydroxy-2-naphthoyl-(2-biphenylyl)amide |
| II-16 | 2,3-diCl-C₆H₃– | H | 4-methyl-3-hydroxy-2-naphthoyl-(4-cyanophenyl)amide |
| II-17 | 2-Cl-C₆H₄– | Br | 4-methyl-3-hydroxy-2-naphthoic acid |
| II-18 | 4-Cl-C₆H₄– | –CN | 1-methyl-2-hydroxy-11H-benzo[a]carbazole-3-carboxylic acid (2-ethylphenyl)amide |
| II-19 | 3,4-diCl-C₆H₃– | –CN | 4-methyl-3-hydroxy-2-anthroyl-(2-biphenylyl)amide |
| II-20 | 4-Cl-C₆H₄– | –CH₃ | dibenzofuran-based hydroxy carboxamide (3-cyanophenyl) |
| II-21 | 2,4,5-triCl-C₆H₂– | H | 4-methyl-3-hydroxy-2-naphthoyl hydrazone of 3-cyanobenzaldehyde |
| II-22 | 4-CH₃-C₆H₄– | H | naphthalene-dicarboximide with 4-chlorophenyl (3-hydroxy) |

-continued
Examples of azo pigments of the formula [II]:
| Azo pigment | Z | X | Cp |
|---|---|---|---|
| II-23 | 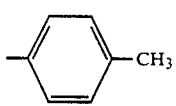 | H | 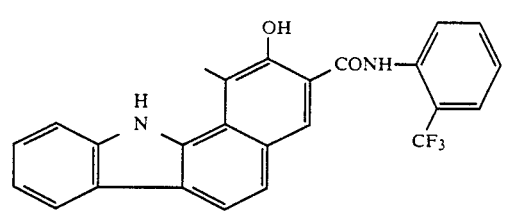 |
| II-24 | 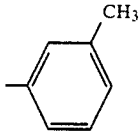 | —CN | 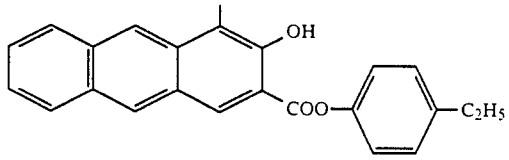 |
| II-25 | 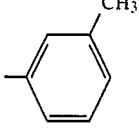 | Cl | 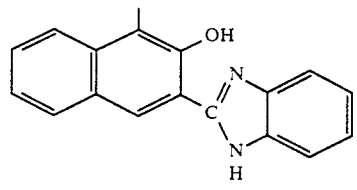 |
| II-26 | 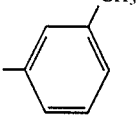 | —CN | 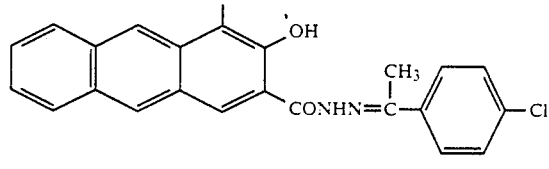 |
| II-27 | 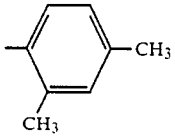 | —CN | 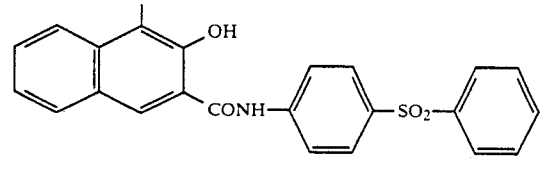 |
| II-28 | 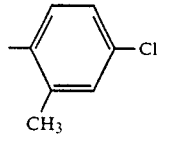 | H | 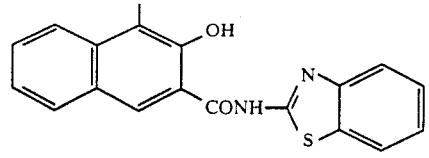 |
| II-29 | 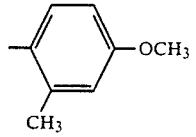 | H | 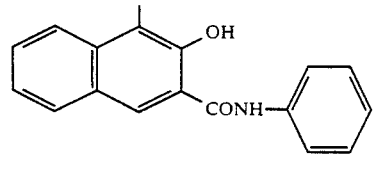 |
| II-30 | —CH$_3$ | —CN | 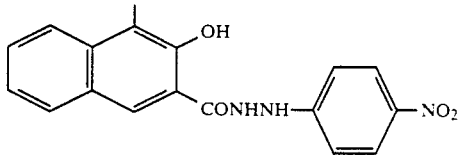 |

-continued

Examples of azo pigments of the formula [II]:

| Azo pigment | Z | X | Cp |
|---|---|---|---|
| II-31 | $-CH_3$ | H | (carbazole-fused naphthol with $-COO-C_6H_4-NO_2$ (para) and methyl, OH substituents) |
| II-32 | $-C_2H_5$ | H | (methyl-hydroxynaphthalene with $-CONHN=CH-C_6H_4-CN$) |
| II-33 | $-C_2H_5$ | H | (carbazole-fused naphthol with methyl, OH and $-CONHN=CH-C_3H_7n$) |
| II-34 | $-C_2H_4OH$ | $-CN$ | (carbazole-fused naphthol with methyl, OH and $-CONH-C_6H_4-CF_3$ (para)) |
| II-35 | $-nC_3H_7$ | $-Cl$ | (methyl-hydroxynaphthalene with $-CONH-C_6H_4-CF_3$ (meta)) |
| II-36 | $-C_2H_4CN$ | H | (chloro-methyl-hydroxynaphthalene with $-CONH-C_6H_4-F$ (para)) |
| II-37 | $-CH_2-CH=CH_2$ | $-C_2H_5$ | (carbazole-fused naphthol with methyl, OH and $-COO-C_6H_5$) |
| II-38 | $-CH_2-CH=CH_2$ | $-CN$ | (carbazole-fused naphthol with methyl, OH and $-CONH-C_6H_4-OC_2H_5$ (ortho)) |

-continued
Examples of azo pigments of the formula [II]:
| Azo pigment | Z | X | Cp |
|---|---|---|---|
| II-39 | 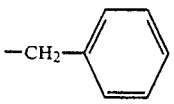 | H | 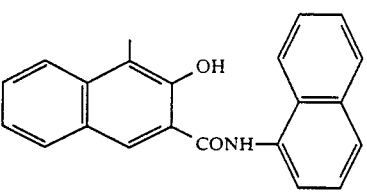 |
| II-40 | 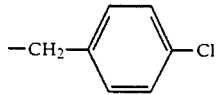 | —CN | 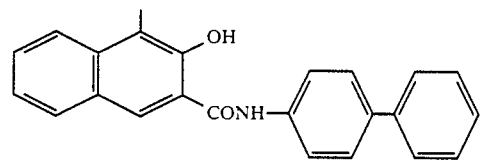 |
| II-41 | 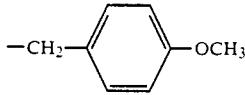 | —CN | 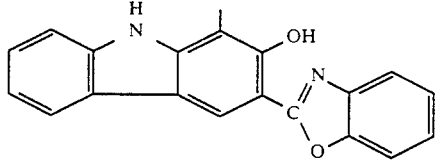 |
| II-42 | 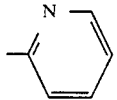 | H | 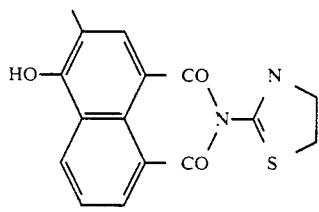 |
| II-43 | 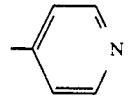 | H | 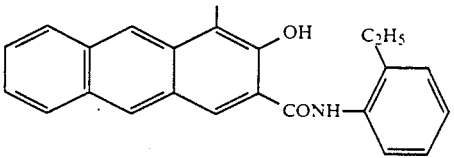 |
| II-44 | 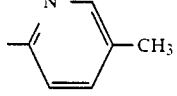 | —CN | 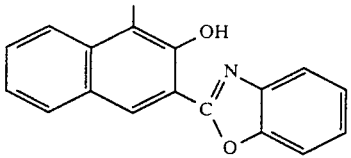 |
| II-45 | 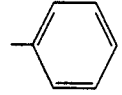 | —CH$_3$ | 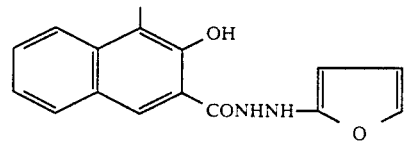 |
| II-46 | 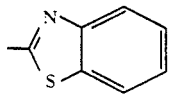 | —CN | 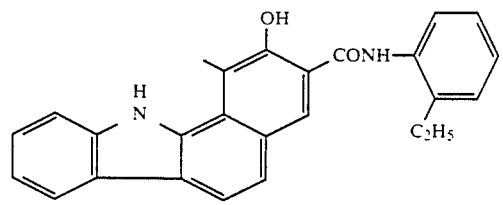 |

-continued

Examples of azo pigments of the formula [II]:

| Azo pigment | Z | X | Cp |
|---|---|---|---|
| II-47 | thiazole ring | H | dibenzofuran with OH, CH3, CONH-C6H4-OC2H5 |
| II-48 | furan ring | Cl | naphthalene with HO, CH3, and N(C2H5OH) bridged by two CO groups |
| II-49 | phenyl | H | naphthalene with OH, CH3, CONHN=CH—CH=CH—(o-NO2-C6H4) |
| II-50 | 4-chloro-3-methoxyphenyl (OCH3, Cl) | H | carbazole with OH, CH3, CONH-C6H4-CF3 |
| II-51 | 4-cyanophenyl (CN) | H | naphthalene with OH, CH3, CONH—C6H4—N=N—C6H5 |
| II-52 | 3,4-dichlorophenyl (Cl, Cl) | —CN | naphthalene with OH, CH3, CONH—C6H4—CN |
| II-53 | —CH3 | H | naphthalene with HO, CH3, and N(C2H4OH) bridged by two CO groups |

General structure:

$$Cp-N=N-\text{Ar}-C=C(X)-C(=C)-\text{Ar}-N=N-Cp$$

with pyrazole ring bearing Z substituent on N.

-continued
Examples of azo pigments of the formula [II]:
| Azo pigment | Z | X | Cp |
|---|---|---|---|
| II-54 | —CH₃ | —CN | 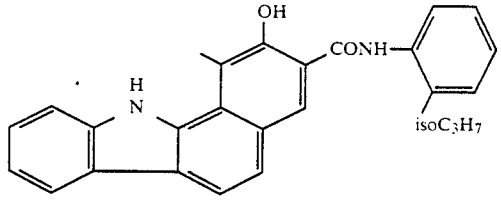 |
| II-55 | 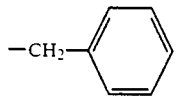 | —CN | 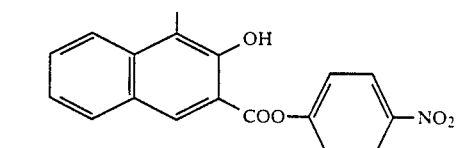 |
| II-56 | —CH₂—CH=CH₂ | —CN | 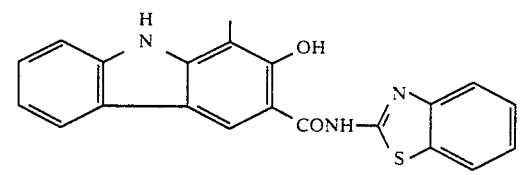 |
| II-57 | —CH₂—CH=CH₂ | —CN | 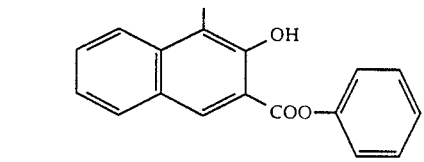 |
| II-58 | 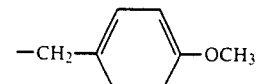 | H | 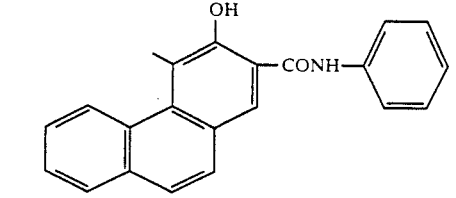 |
| II-59 | 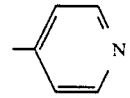 | —CH₃ | 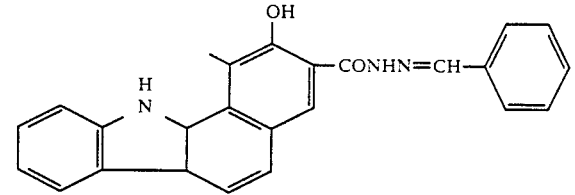 |
| II-60 | 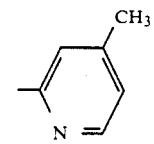 | H | 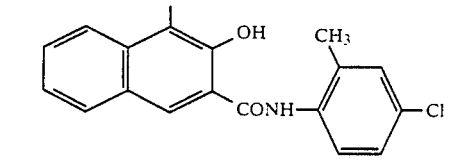 |
| II-61 |  | —CN | 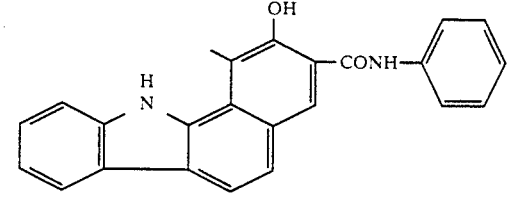 |

| Azo pigment | Z | X | Cp |
|---|---|---|---|
| II-62 | 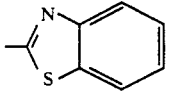 | —CN |  |
| II-63 | 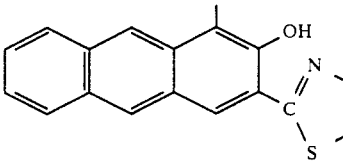 | —CN | 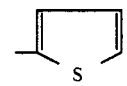 |

The azo pigments represented by the formula [I] or [II] can be easily synthesized by customarily azotizing a divalent amino compound represented by the following formula:

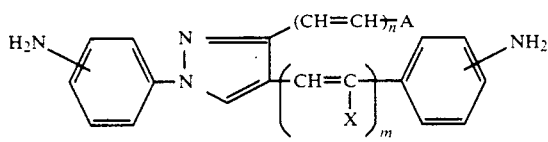

or

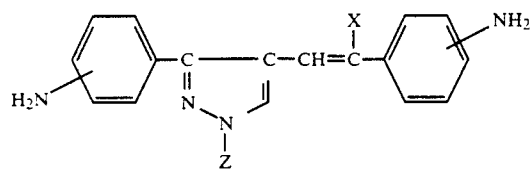

and then coupling with a corresponding coupler in the presence of an alkali or, alternatively, isolating the diazonium salt of said divalent amino compound in the form of borofluoride or zinc chloride double salt and coupling with a coupler in the presence of an organic or inorganic alkali in a suitable solvent such as, for example, N,N-dimethylformamide, dimethyl sulfoxide, ethanol or dioxane.

Synthesis of typical examples of the azo pigments used in this invention is described below.

Synthesis Example 1 (Azo pigment No. I-13)

Acetophenone and p-nitrohydrazine in equimolar amount were allowed to react in ethanol to obtain acetophenone-p-nitrophenylhydrazone. The resulting hydrazone was converted to a pyrazole compound represented by the following structural formula using phosphorus oxychloride and dimethylformamide.

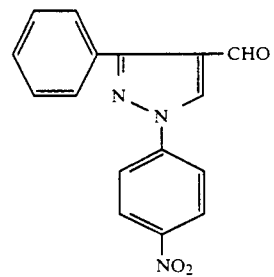

(melting point: 211–212.5° C.)

The resulting aldehyde derivative of pyrazole and p-nitrobenzyl cyanide were dissolved in dioxane and the solution was reacted with piperidine to obtain 1-(p-nitrophenyl)-3-phenyl-4-(β-cyano-p-nitrostyryl)-pyrazole.

Recrystallization was effected with pyridine.

The resulting dinitro derivative was reduced with iron powder and glacial acetic acid to easily obtain a diamino compound represented by the following structural formula:

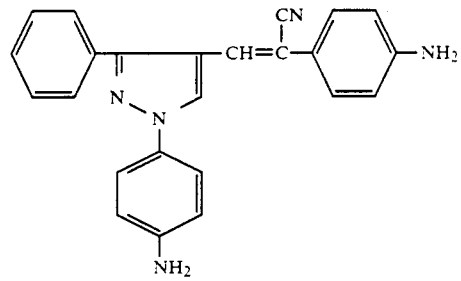

(melting point: 248–249.5° C.)

Upon examination of the IR absorption (KBr method), it was found that absorption at 1340 cm$^{-1}$ due to a nitro group disappeared and, instead, an absorption due to amino group was observed at 3320 cm$^{-1}$. Further, there was observed absorption at 2200 cm$^{-1}$ due to cyano group.

0.75 g of the thus obtained diamino compound was dissolved in 20 ml of 2N-hydrochloric acid and insoluble matters were removed. Then, to the solution was added dropwise a solution prepared by dissolving 0.5 g of sodium nitrite in a minimum amount of water under ice cooling to allow the reaction to proceed for about 1 hour. Then, active carbon was added thereto, followed by filtration to obtain a diazonium solution.

1.2 g of 2-hydroxy-N-(4-cyanophenyl)-3-naphthoic acid amide and 1.0 g of triethylamine were dissolved in 20 ml of dimethyl sulfoxide and the solution was cooled to 0–5° C. to obtain a coupling component.

Then, the above diazonium salt solution was added dropwise to the above coupler solution and the resulting blackish purple pasty solution was kept at 0–10° C. and stirred for 3 hours. The resulting precipitate was collected by filtration, fully washed with dimethylformamide, then with hot water and finally with acetone and dried at 80° C. for about 5 hours to obtain 1.05 g of black powder having somewhat metallic luster and having a decomposition point of about 345° C.

Synthesis Example 2 (Azo pigment No. I-105)

10.2 g of acetophenone -p-nitrophenylhydrazone (melting point: 186.5–188.0° C.) obtained by equimolar reaction of p-nitrophenylhydrazine and acetophenone was subjected to Vilsmeir reaction with phosphorus oxychloride and dimethylformamide to obtain 11.8 g of 1-(p-nitrophenyl)-3-phenylpyrazole-4-carboxyaldehyde (melting point: 208.5–211.0° C.) having the following structural formula.

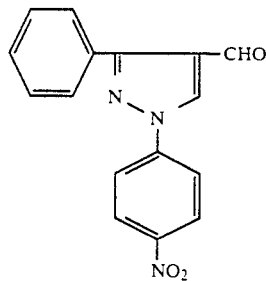

6.0 g of the thus obtained pyrazole compound and 6.0 g of diethyl-p-nitrobenzyl phosphonate were reacted in the presence of potassium tert-butoxide to obtain 8.2 g of yellow 1-(p-nitrophenyl)-3-phenyl-4-(p-nitrostylyl)-pyrazole (melting point: 228–233° C.).

The resulting dinitro derivative of pyrazole was reduced with iron powder and glacial acetic acid to obtain a diamino compound of pyrazole of light brown and having the following structural formula (melting point: 153.5–156.0° C.).

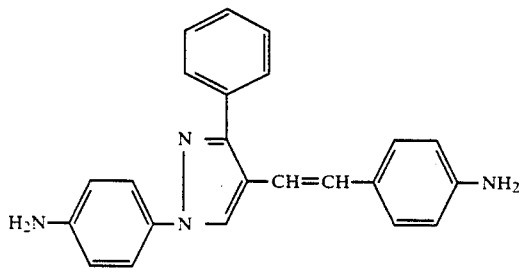

2.12 g of the above diamino compound was dispersed in 40 ml of 1N hydrochloric acid and thereto was added an aqueous solution containing 0.9 g of sodium nitrite in 3.0 ml of water under ice cooling to produce an aqueous diazonium salt solution.

The resulting aqueous diazonium salt solution was added dropwise to a solution prepared by dissolving 3.6 g of 2-hydroxy-3-naphthoic acid o-chloroanilide and 8.0 g of triethylamine in dimethylformamide at room temperature. After stirring for about 2 hours, the precipitated reddish purple powder was collected by filtration and well washed with water and dimethylformamide and finally with acetone to obtain 5.4 g of raddish purple crystal having somewhat metallic luster.

Melting point: 250° C. or higher.

Synthesis Example 3 (Azo pigment No. II-9)

Synthesis of tetrazonium salt

A 97% aqueous sodium nitrite solution was added dropwise at 0-5° C to a mixture comprising 3.8 g of 1-phenyl-3-(4'-aminophenyl) -4-(4"-amino-β-cyanostyryl)-pyrazole having the following formula and a melting point of 247–249° C., 40 ml of 6N hydrochloric acid and 60 ml of water, followed by stirring for 1 hour at this temperature. A small amount of insoluble matter was removed by filtration and to the residue was added 42% borofluoric acid and the precipitated crystal was collected by filtration, washed with water and dried to yield a tetrazonium salt. Yield: 4.1 g.

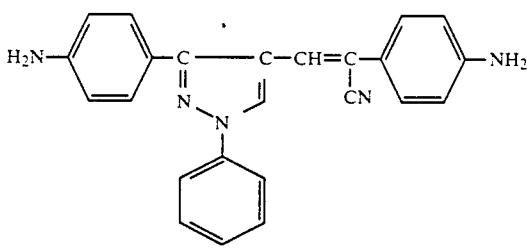

Synthesis of azo pigment No. II-9

1.4 g of the above tetrazonium salt and 1.9 g of a coupler having 2-hydroxy-benzo[a]carbazole skeleton were dissolved in 100 ml of N,N-dimethylformamide and to the solution was added dropwise at 5–10° C. C over a period of 10 minutes a solution prepared by dissolving 1.5 g of triethanolamine in 10 ml of dimethylformamide, followed by stirring at room temperature for 3 hours. Then, the resulting precipitate was collected by filtration, thoroughly washed with water and then with acetone to yield 3.1 g of a blackish blue powder. Melting point: 340° C. or higher.

Other azo pigments of this invention can also be obtained in a manner similar to the above synthetic examples.

The electrophotographic photoreceptor of this invention has a photosensitive layer containing at least one azo pigments represented by the formula [I] or [II]. There are known various types of photosensitive layer. The photosensitive layer of the electrophotographic photoreceptor of this invention may be any of the known types, but is normally of the following types:

(1) A photosensitive layer comprising an azo pigment.
(2) A photosensitive layer comprising a dispersion of an azo pigment in a binder.

(3) A photosensitive layer comprising a dispersion of an azo pigment in a known charge transfer material.

(4) A photosensitive layer of a laminate type comprising the photosensitive layer (1), (2) or (3) as a charge generating layer and a charge transfer layer containing known charge transfer material.

The azo pigment represented by the above formulas generates in a high efficiency a charge carrier upon absorption of light. The generated carrier can be transferred through the medium of the azo pigment, but more desirably through the medium of a known charge transfer material. From such a viewpoint, the photosensitive layers of the types (3) and (4) are especially preferred.

The charge transfer materials are generally classified into two groups, the first group which transfer the charge by electron propagation and the second group which transfer the charge by hole propagation. Materials of both groups can be used in the photosensitive layer of the photoreceptor of this invention. Mixtures of those which have the same functions or of those which have different functions may also be used.

The materials of the first group are electron attractive compounds having electron attractive groups such as nitro group, cyano group, ester group and the like. As examples thereof, mention may be made of nitrated fluorenones such as 2,4,7-trinitrofluorenone and 2,4,5,7-tetranitrofluorenone; tetracyanoquinodimethane, tetracyanoethylene, 2,4,5,7-tetraitroxanthone, 2,4,8-trinitrothioxanthone and polymers of these compounds.

The materials of the second group are electron donative, organic photoconductive compounds, Examples thereof are shown below:

Hydrazones:

(1) 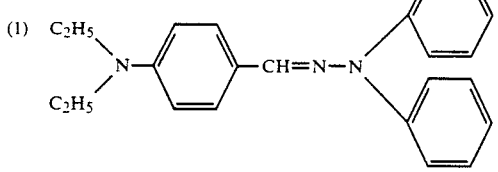

(2) 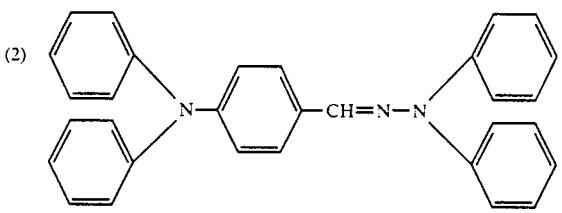

(3) 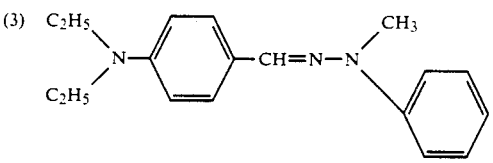

(4) 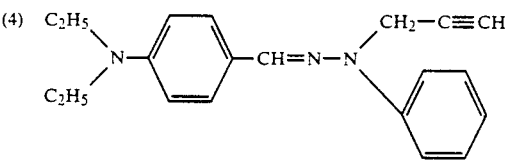

(5) 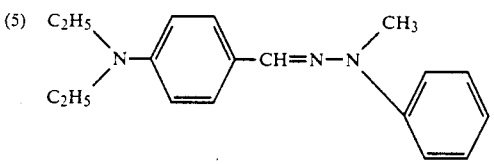

(6) 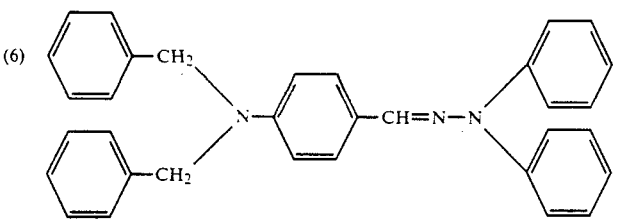

-continued
(7) 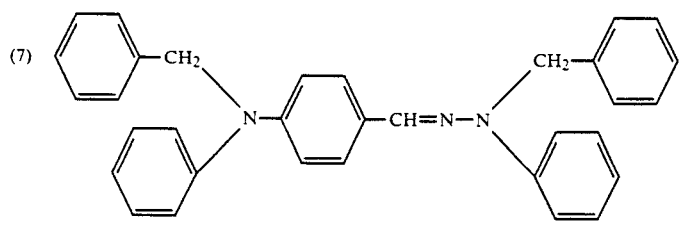
(8) 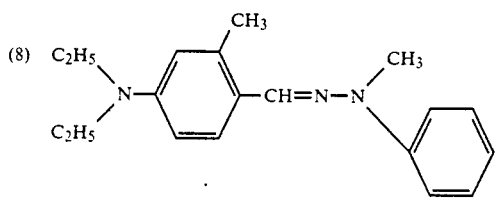
(9) 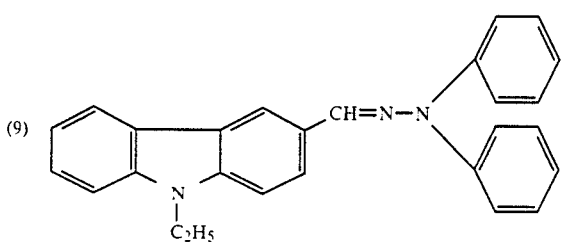
(10) 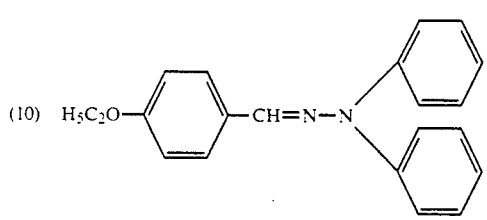
(11) 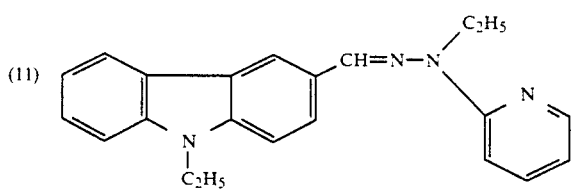
(12) 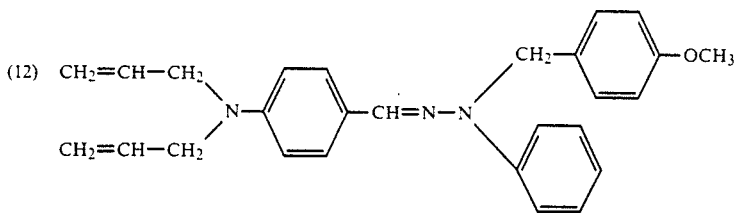
(13) 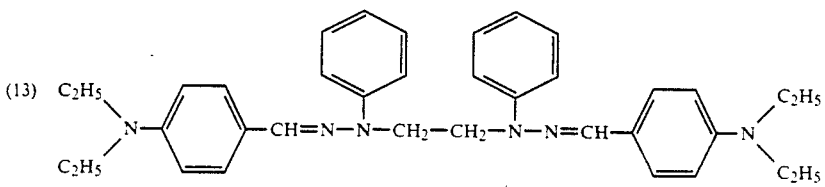
(14) 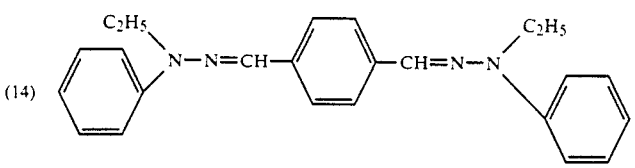

(15) 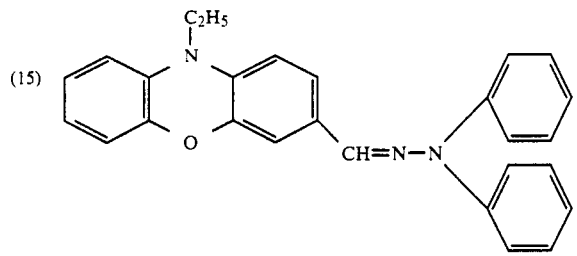
(16) 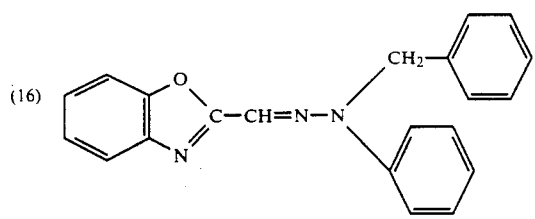
(17) 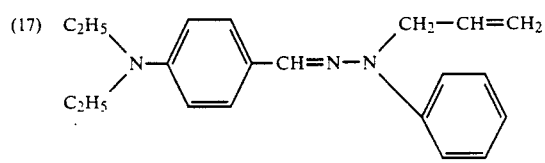
(18) 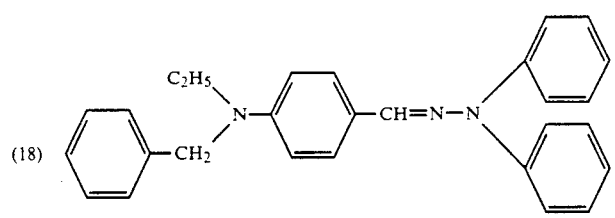
(19) 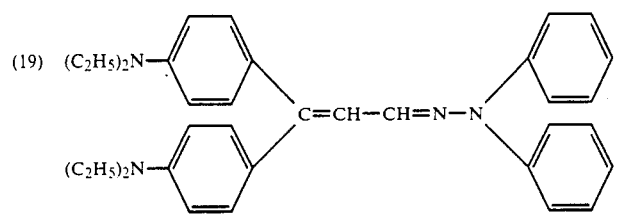
(20) 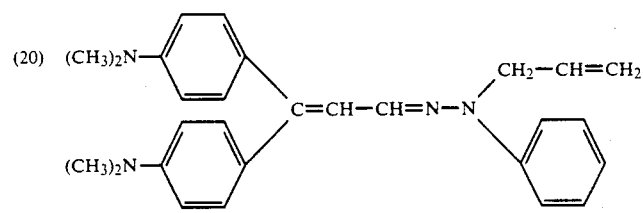
(21) 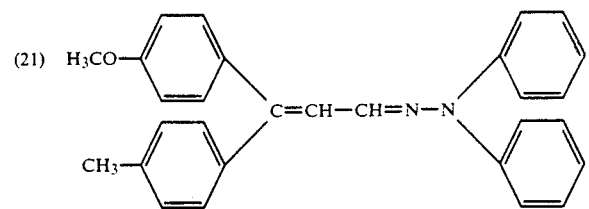

(22) 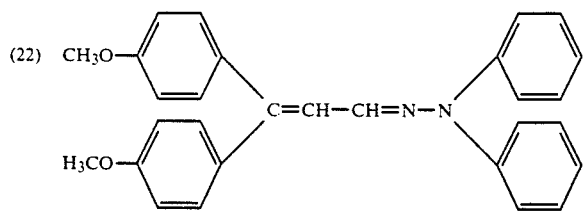
(23) 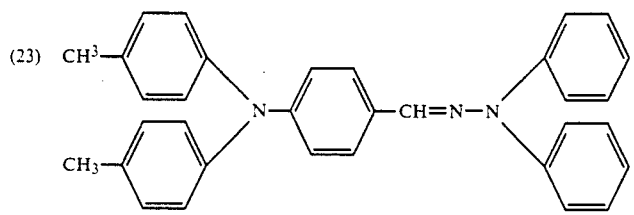
Pyrazolines:
(1) 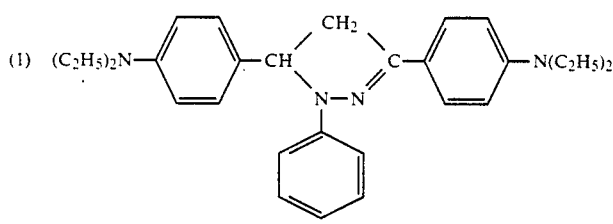
(2) 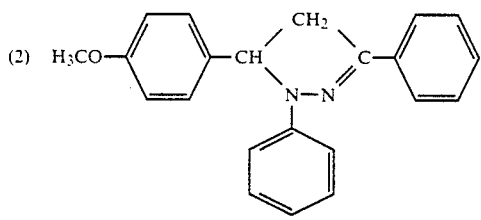
(3) 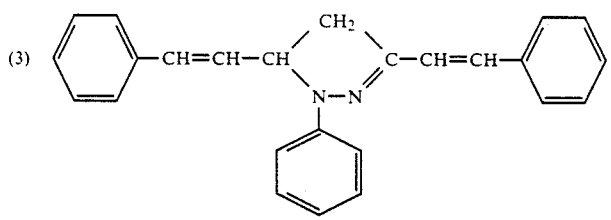
(4) 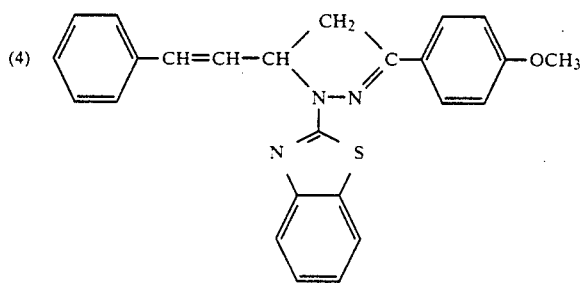

(5) 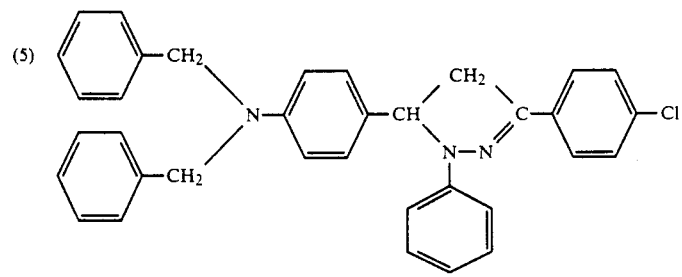
(6) 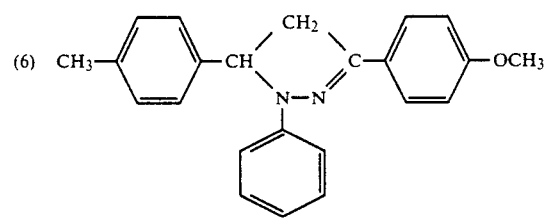
(7) 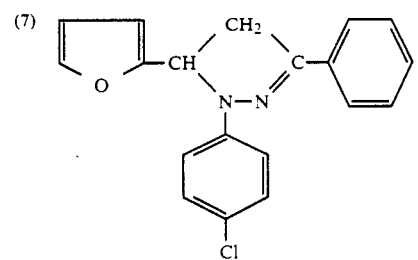
(8) 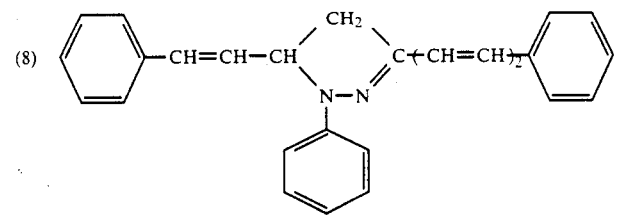
(9) 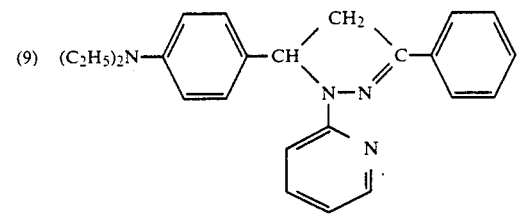
Diarylalkanes:
(1) 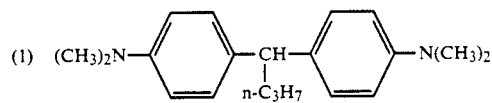
(2) 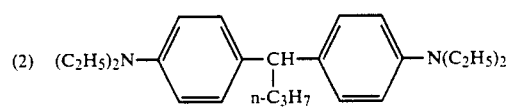
(3) 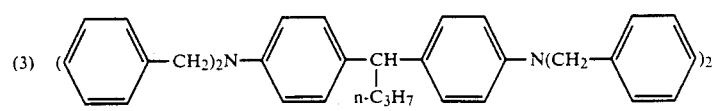

-continued
(4) 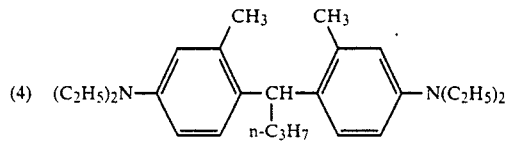
(5) 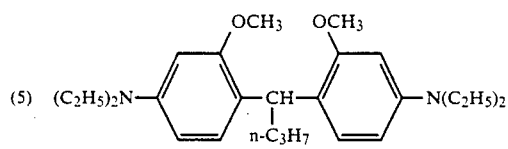
(6) 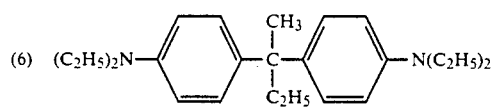
(7) 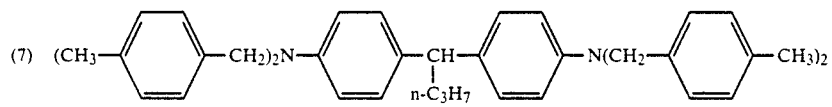
(8) 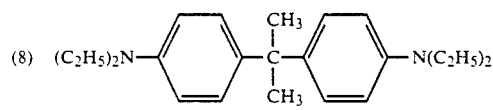
(9) 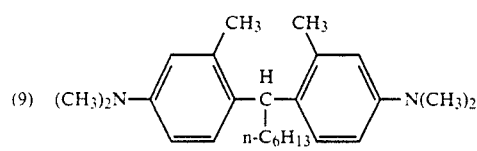
(10) 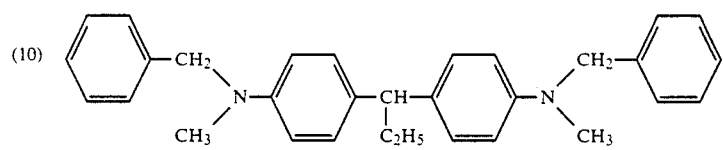
(11) 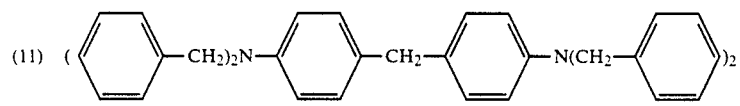
(12) 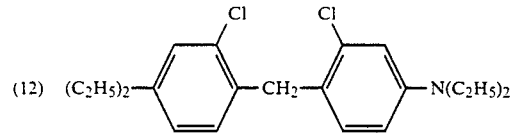
Alkylenediamines:
(1) 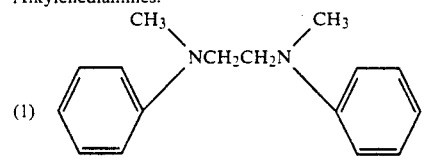
(2) 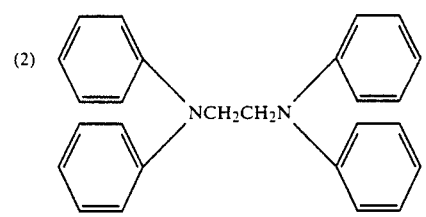

(3) 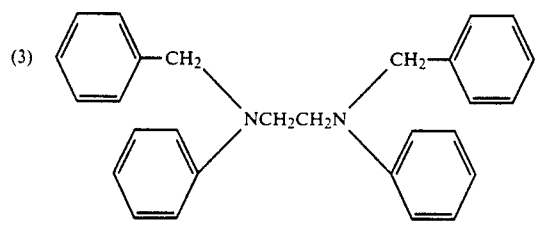
(4) 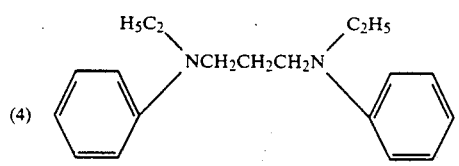
(5) 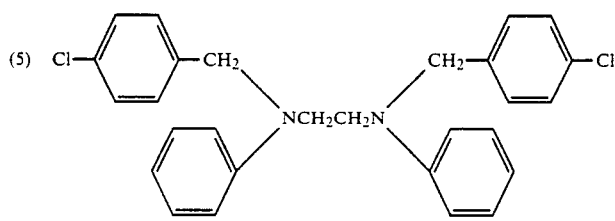
Dibenzylanilines:
(1) 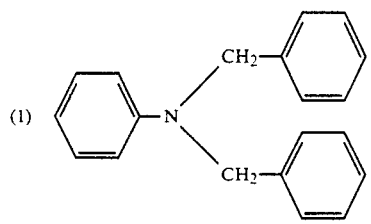
(2) 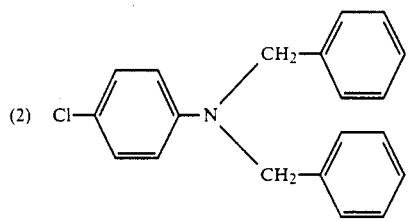
(3) 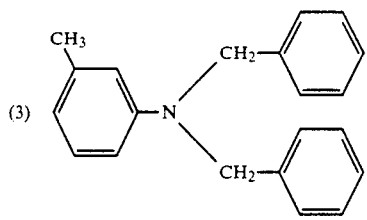
(4) 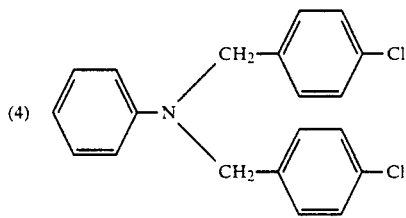

(5) 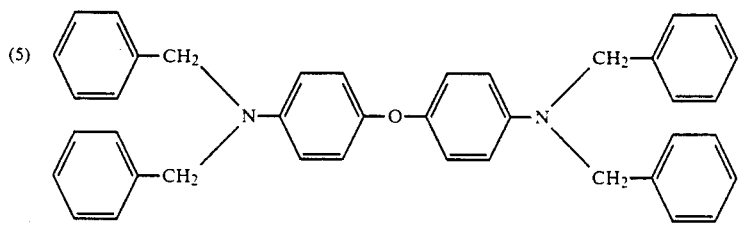
(6) 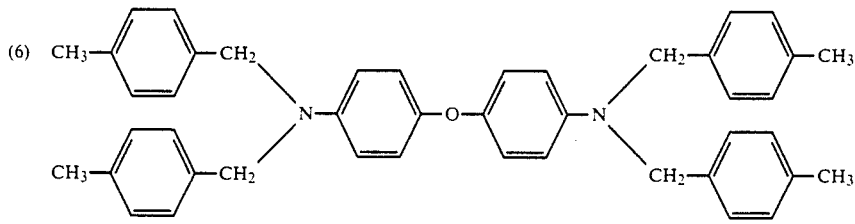
(7) 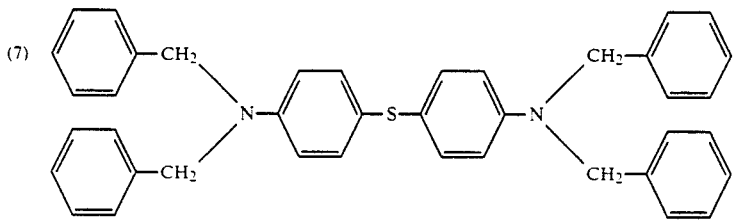
(8) 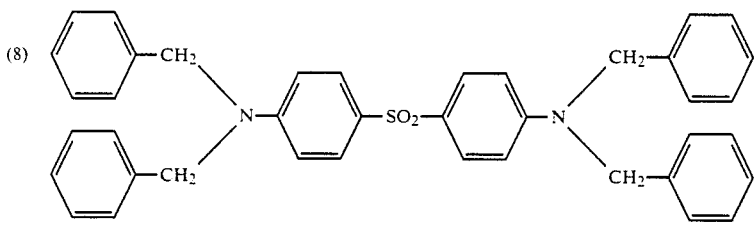
(9) 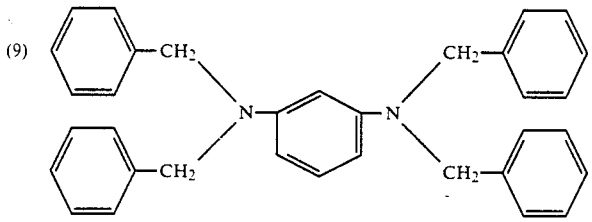
(10) 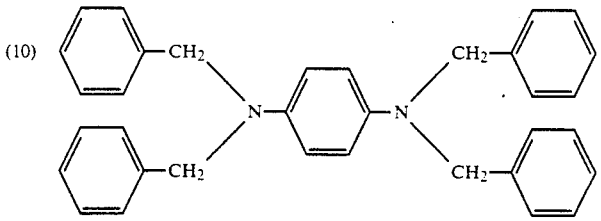
Triphenylamines:
(1) 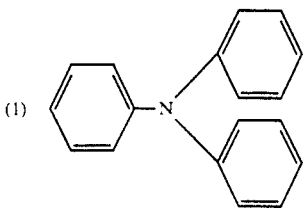

(2) 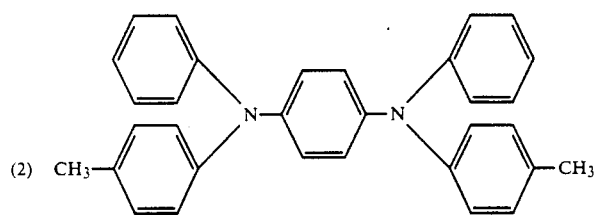
(3) 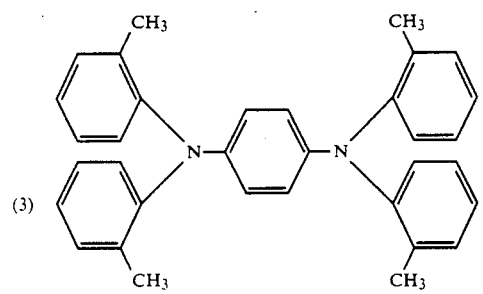
(4) 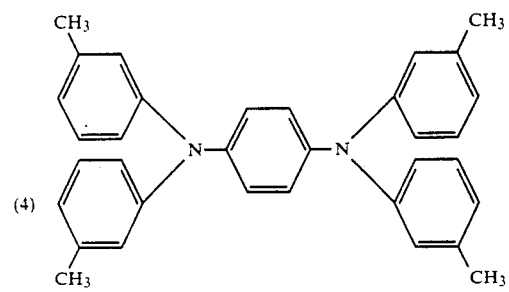
(5) 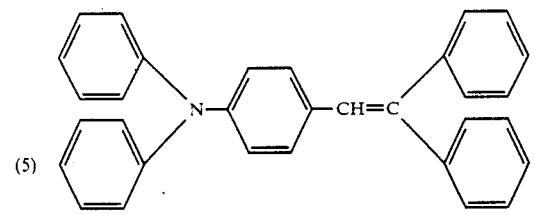
(6) 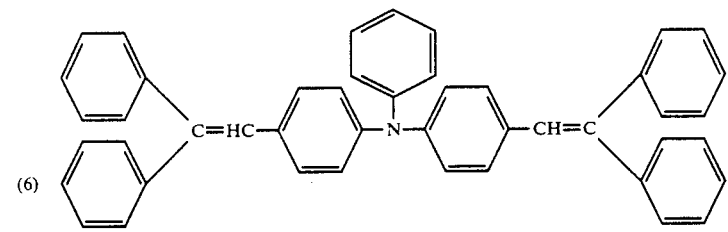
Diphenylbenzylamines:
(1) 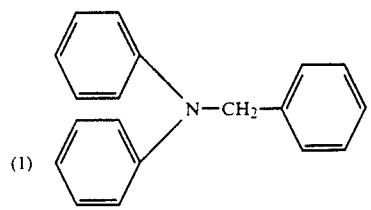

(2) 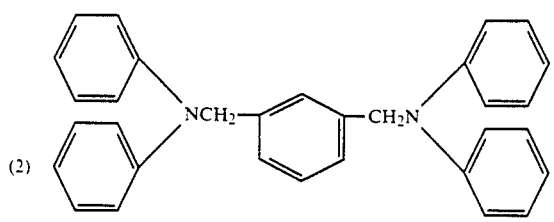
(3) 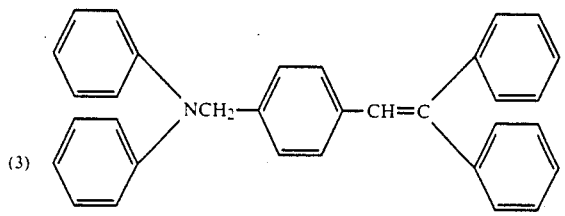
Triarylalkanes:
(1) 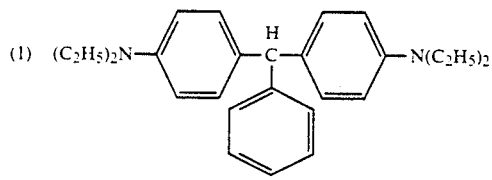
(2) 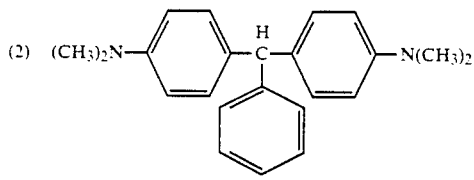
(3) 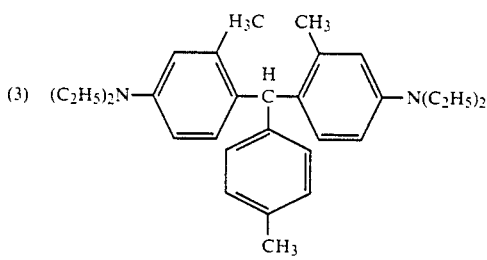
(4) 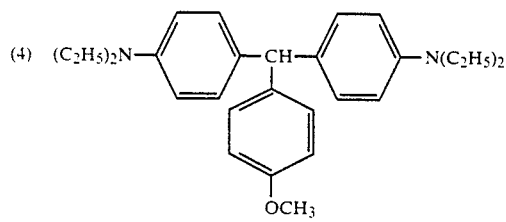
(5) 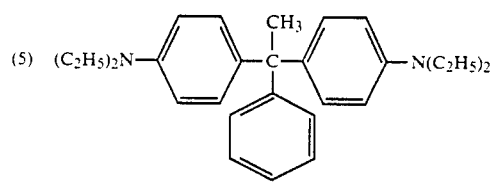

(6) 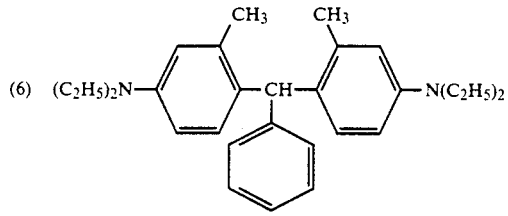
(7) 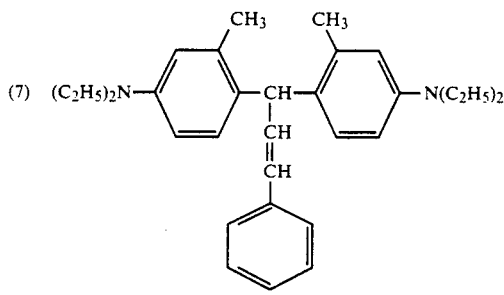
(8) 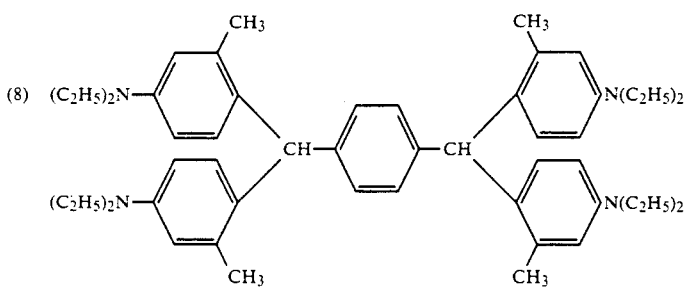
Oxadiazoles:
(1) 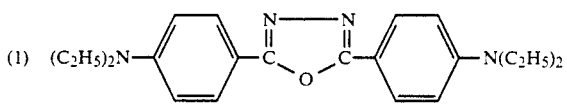
(2) 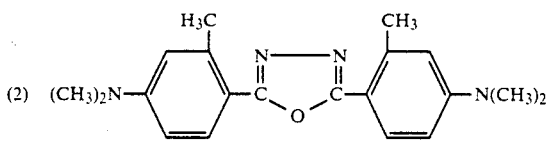
(3) 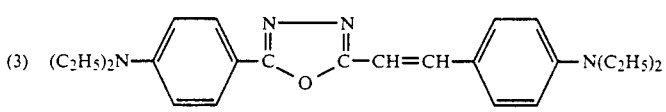
(4) 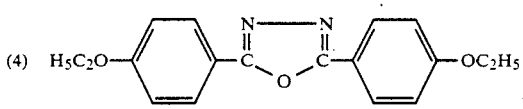
(5) 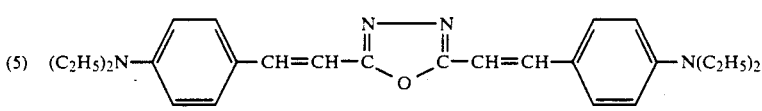
(6) 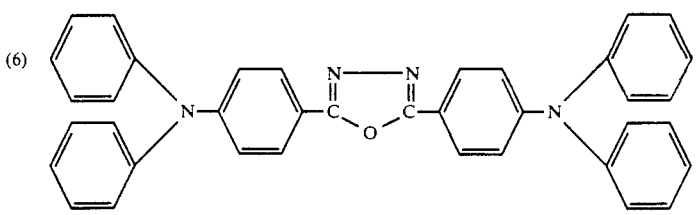

-continued
Anthracenes:
(1) 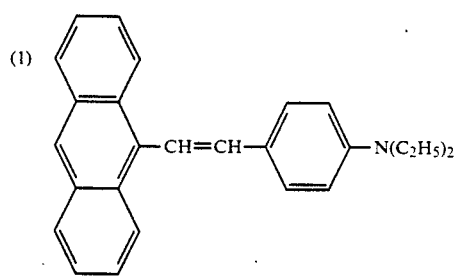
(2) 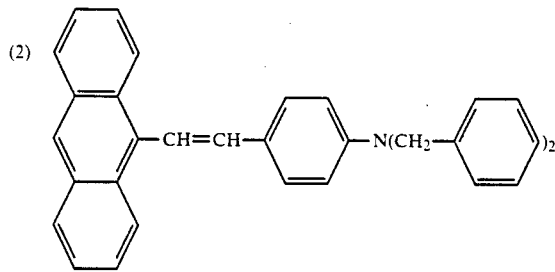
Oxazoles and oxathiazoles:
(1) 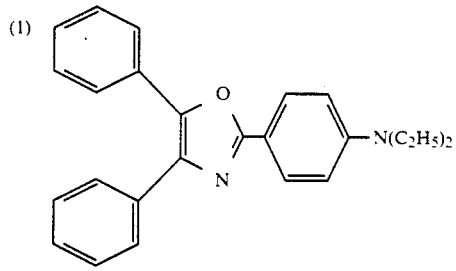
(2) 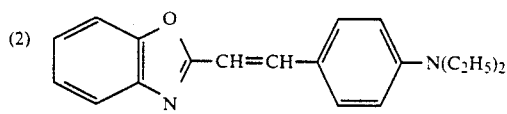
(3) 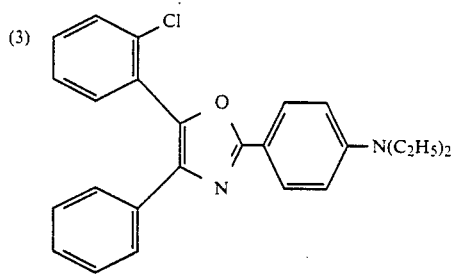
(4) 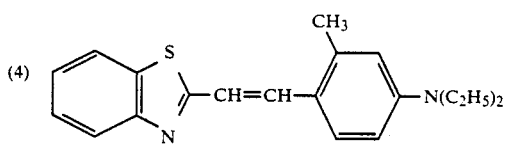
(5) 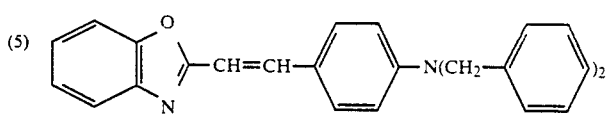

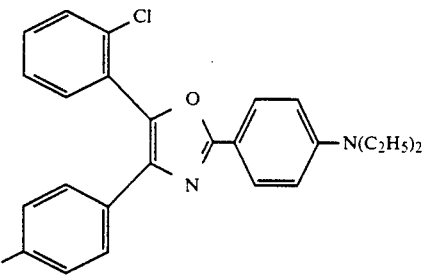

(6)

Further, there may also be used polymeric compounds such as poly-N-vinylcarbazole, halogenated poly-N-vinylcarbazole, polyvinylpyrene, polyvinylanthracene, polyvinylacridine, polyglycidylcarbazole, polyvinylacenaphthylene and ethylcarbazole formaldehyde resin.

The carrier transfer materials are not limited to those mentioned here and may be used alone or in combination of two or more.

The electrophotographic photoreceptor of this invention can be prepared by conventional methods.

For example, the electrophotographic photoreceptor having the photosensitive layer of type (1) can be prepared by dissolving or dispersing the azo pigment represented by the formula [I] or [II] in a suitable medium and coating the resulting coating composition on an electroconductive support and drying the coat to form a photosensitive layer of normally 0.1-several ten $\mu m$ thick.

As the medium for preparation of the coating composition, mention may be made of, for example, basic solvents which dissolves azo dyes such as n-butylamine and ethylenediamine and those which disperse azo pigments, for example, ethers such as tetrahydrofuran and 1,4-dioxane; ketones such as methyl ethyl ketone and cyclohexanone; aromatic hydrocarbons such as toluene and xylene; non-protonic polar solvents such as N,N-dimethylformamide, acetonitrile, N-methylpyrrolidone and dimethyl sulfoxide; alcohols such as methanol, ethanol and isopropanol; esters such as ethyl acetate, methyl acetate and methyl cellosolve acetate; and chlorinated hydrocarbons such as dichloroethane and chloroform.

In case of using media which disperse azo pigments, azo pigments must be pulverized to a particle size of 5 $\mu m$ or less, preferably 3 $\mu m$ or less and most suitably 1 $\mu m$ or less.

As the electroconductive supports on which a photosensitive layer is formed, there may be any of those which are normally used for electrophotographic photo-receptors.

Specific examples thereof are metallic drums or sheets of, for example, aluminum and copper and laminates of these metal foils and sheets vapor-deposited with such metals.

Further examples of the supports are plastic films, plastic drums and papers made electroconductive by coating with electroconductive materials such as metallic powders, carbon black, copper iodide and polymeric electrolytes together with suitable binders. Furthermore, there may also be used plastic sheets or drums made conductive by containing conductive materials such as metallic powder, carbon black and carbon fibers.

The photoreceptor having a photosensitive layer of type (2) can be prepared by dissolving a binder in the coating composition used for formation of the photosensitive layer of type (1).

In this case, the medium of the coating composition is preferably one which dissolves binder.

As binders, mention may be made of, for example, polymers and copolymers of vinyl compounds such as styrene, vinyl acetate, acrylic esters and methacrylic esters and polymers such as phenoxy resins, polysulfones, arylate resins, polycarbonates, polyesters, cellulose esters, cellulose ethers, butyral resins, epoxy resins and acrylpolyol resins.

Amount of binder is usually 0.1-5 parts by weight for 1 part of azo pigment.

In making such a type of photosensitive layer, it is desirable to allow azo pigments to be present in the form of fine particles such as, for example, of 3 $\mu m$ or less, especially 1 $\mu m$ or less in particle size in the binder.

Likewise, the photoreceptor having a photosensitive layer of type (3) can be prepared by dissolving a charge transfer medium in the coating composition used for preparation of the photosensitive layer of type (1). Any of the above mentioned charge transfer media can be used.

The charge transfer medium is used preferably together with a binder, except for polyvinylcarbazole and polyglycidylcarbazole which serve also as binders. Any of the binders mentioned above can be used.

The binder is used normally in an amount of 0.5-100 parts by weight for 1 part by weight of azo pigment. The charge transfer medium is used normally in an amount of 0.2-3.0, preferably 0.3-1.2 parts by weight for 1 part by weight of azo pigment. The charge transfer medium which serves also as a binder is normally used in an amount of 1-10 parts by weight for 1 part by weight of azo pigment.

Like the photosensitive layer of type (3), in the photosensitive layer of this type, azo pigment is preferably present in the form of fine particles in the charge transfer medium and the binder.

The photoreceptors having a photosensitive layer of type (4) can be prepared by coating a coating composition prepared by dissolving a charge transfer medium in a suitable medium on the photosensitive layer of type (1), (2) or (3) and drying the coat, resulting in a charge transfer layer on the photosensitive layer.

In this case, the photosensitive layers of types (1), (2) and (3) serve as charge generating layer. The charge transfer layer is not necessarily provided on the charge generating layer, but can be provided between the charge generating layer and the conductive support. However, the former structure is preferred from the point of durability.

The charge transfer layer is formed in the similar manner to that for formation of the photosensitive layer of type (3). That is, there may be used the coating composition used for formation of the photosensitive layer of type (3) from which azo pigment is omitted.

Thickness of the charge transfer layer is ordinarily 5-50 μm.

Of course, the photosensitive layer of the electrophotographic photoreceptor of this invention may contain known sensitizers.

Suitable sensitizers include Lewis acids and dyes capable of forming a charge transfer complex with organic photoconductive materials.

As Lewis acids, mention may be made of, for example, quinones such as chloranil, 2,3-dichloro-1,4-naphthoquinone, 2-methylanthraquinone, 1-nitroanthraquinone, 1-chloro-5-nitroanthraquinone, 2-chloroanthraquinone and phenanthrenequinone; aldehydes such as 4-nitrobenzaldehyde; ketones such as 9-benzoylanthracene, indanedione, 3,5-dinitrobenzophenone and 3,3',5,5-tetranitrobenzophenone; acid anhydrides such as phthalic anhydride and 4-chloronaphthalic anhydride; cyano compounds such as tetracyanoethylene, terephthalmalonodinitrile and 4-nitrobenzalmalononitrile; and other electron attractive compounds such as 3-benzalphthalide, 3-(α-cyano-p-nitrobenzal)phthalide and 3-(α-cyano-p-chlorobenzal)-phthalide.

As examples of suitable dyes, mention may be made of triphenylmethane dyes such as Methyl Violet, Brilliant Green and Crystal Violet; thiazine dyes such as Methylene Blue; quinone dyes such as Quinizarin; cyanine dyes, pyrylium salts, thiapyrylium salts and benzopyrylium salts.

The photosensitive layer can also contain inorganic photoconductive fine particles such as selenium and selenium-arsenic alloys and organic photoconductive pigments such as copper-phthalocyanine pigments and perylene pigments.

The photosensitive layer of the photoreceptor of this invention can further contain known plasticizers to improve film-forming property, flexibility and mechanical strength. Suitable plasticizers include phthalate esters, phosphate esters, epoxy compounds, chlorinated paraffins, chlorinated fatty acid esters, and aromatic compounds such as alkylated naphthalenes.

The photoreceptor of this invention may, of course, contain, if necessary, an adhesive layer, an intermediate layer, an insulating layer, and a protective layer.

The photoreceptor containing azo pigment according to this invention is high in sensitivity, superior in color sensitivity and upon repeated use shows little change in sensitivity and charge accepting property, little fatigue and excellent durability.

Furthermore, the photoreceptor of this invention can be used not only in electrophotographic copier but also widely in other electrophotographic fields such as printers using lasers, Braun tube (CRT) and light-emitting diodes (LED) as light source.

The following nonlimiting examples further illustrate the invention.

Example 1

On a conductive support of a polyester film clad with aluminum foil (ALPET 85 supplied by Daido Kako Co.; 10 μ in aluminum foil thickness) was formed an intermediate layer, 0.05 μ in thickness, of a vinyl chloride-vinyl acetate-maleic anhydride copolymer (ESUREK MF-10 supplied by Sekisui Chemical Co.). A carrier generating layer was formed by coating on said intermediate layer an azo pigment dispersion prepared by adding 2 g of the aforementioned azo pigment No. I-12 and 1 g of a butyral resin (ESUREK B supplied by Sekisui Chemical Co.) in 100 ml of tetrahydrofuran and dispersing in a paint conditioner for about 1 hour, at a dry thickness of 0.3 μ. A carrier transfer layer, 19 μ in dry thickness, was formed thereon by coating on the carrier generating layer a solution comprising 5 g of N,N-dibenzylaminobenzaldehyde-1,1diphenylhydrazone, a carrier transfer material, and 7 g of a polyarylate resin dissolved in 50 ml of 1,2dichloroethane and drying the coating to obtain the electrophotographic photoreceptor of this invention. This photoreceptor was left to stand in the dark place at 30° C. for 1 week and then mounted on an electrostatic paper testing apparatus (SP-428 supplied by Kawaguchi Denki Seisakusho Co.) and tested for the characteristics in the following manner.

That is, the photosensitive layer was electrostatically charged by subjecting it for 5 seconds to the corona discharge produced by application of a potential of −6KV by a charger and the surface potential $V_o$ (−V) was measured. Then, the charged surface was exposed to a halogen lamp with the illuminance on the surface of the photosensitive layer being 30 lux, and the exposure $E_{1\overline{78}}$ (lux second) necessary to decay the surface potential of the photosensitive layer to ½ was measured.

Further, surface potential after having been exposed with an exposure of 50 lux.second, namely, residual potential $E_{50}$ (−V) was determined. Similar test cycle was repeated 500 times. In each cycle, complete removal of the residual potential was effected by exposing to a tungsten lamp for 0.3 second at 300 lux. The results are shown in Table 1.

TABLE 1

|  | First cycle | 500th cycle |
|---|---|---|
| $V_o$ (−V) | 1040 | 1000 |
| $E_{\frac{1}{2}}$ (lux · sec) | 2.0 | 1.9 |
| $E_{50}$ (−V) | 0-5 | 0 |

Examples 2-6

Five photoreceptors of this inventions were prepared in the same manner as in Example 1 except that aforementioned azo pigment Nos. I-1, I-28, I-35, I-54 and I-63 were used as carrier generating materials. Each photoreceptor was tested for the characteristics as in Example 1. The results are shown in Table 2.

TABLE 2

| | | First cycle | | | 500th cycle | | |
|---|---|---|---|---|---|---|---|
| Example | Azo pigments | $V_o$ (−V) | $E_{\frac{1}{2}}$ (lux · sec) | $E_{50}$ (−v) | $V_o$ (−V) | $E_{\frac{1}{2}}$ (lux · sec) | $E_{50}$ (−V) |
| 2 | Pigment No. I-1 | 980 | 2.8 | about 15 | 980 | 2.7 | about 20 |
| 3 | Pigment No. I-28 | 1080 | 2.1 | about 10 | 1040 | 2.1 | 0 |
| 4 | Pigment No. I-35 | 880 | 1.9 | about 0-5 | 870 | 1.9 | 0 |

TABLE 2-continued

| Example | Azo pigments | First cycle | | | 500th cycle | | |
| --- | --- | --- | --- | --- | --- | --- | --- |
| | | $V_o$ (−V) | $E_{\frac{1}{2}}$ (lux·sec) | $E_{50}$ (−v) | $V_o$ (−V) | $E_{\frac{1}{2}}$ (lux·sec) | $E_{50}$ (−V) |
| 5 | Pigment No. I-54 | 1010 | 2.7 | about 15 | 990 | 2.7 | about 10 |
| 6 | Pigment No. I-63 | 980 | 2.2 | about 5-10 | 940 | 2.1 | 0 |

Example 7

An intermediate layer, 0.1 μ thick, of diallyl phthalate resin (DISODAP B supplied by Osaka Soda Co.) was formed on the outer surface of an aluminum drum having a diameter of 60 mm. On this intermediate layer was formed a carrier generating layer, 0.5 μ in dry thickness, by coating on the intermediate layer a dispersion prepared by adding 2 g of the aforementioned azo pigment No. I-23 to a solution containing 2 g of polyarylate resin dissolved in 100 ml of tetrahydrofuran and dispersing in a paint conditioner for about 3 hours and drying the coating. On this carrier generating layer was formed a carrier transfer layer, 15 μ in dry thickness, by coating a solution prepared by dissolving 10 g of a carrier transfer material, N,N-diethylaminobenzaldehyde-1-(phenyl)-1-methylhydrazone represented by the following formula:

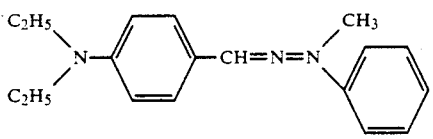

and 12 g of polycarbonate resin (PANLITE L supplied by Teijin Limited) in 100 ml of 1,2-dichloroethane and then drying the coating to obtain the photoreceptor of this invention.

This electrophotographic photoreceptor was mounted on a commercial electrophotographic copier of the cartridge type, which had been partially modified and reproduction was carried out to obtain a clear image high in contrast and faithful to original.

Reproduction was repeated 1000 times and there were obtained visible images which remained throughout the same in quality as the first copy.

Example 8

The drum-type electrophotographic photoreceptor obtained in Example 7 was examined for reflection spectrum by an integrating sphere spectrophotometer (UV-365 of Shimadzu Seisakusho Ltd.). As a result, it was found that the absorption maxima in the visible region were at around 650-690 nm.

It was recognized that the photoreceptor of this invention can endure the actual use under exposure to a light source such as light-emitting diode and He-Ne laser beam.

Example 9

A styrene-n-butyl methacrylate-methacrylic acid copolymer (styrene:n-butyl methacrylate=1:2 (weight ratio) and acid value: 250), the aforementioned azo pigment No. I-35 and 2-phenyl-1-ethylindole-3-aldehyde 1,1-diphenylhydrazone were mixed at a weight ratio of 1.5 : 0.2 : 1.1. A coating composition was prepared from said mixture and dioxane (the resin component and the hydrazone compound were dissolved while the azo pigment was dispersed in the dioxane) and this coating composition was coated on a surface of oxidized and grained Al plate and dried to produce a single-layer type photoreceptor of 6 μ in film thickness. The resulting photoreceptor was tested for the electrophotographic characteristics by the above used electrostatic paper testing apparatus to obtain the following results.

Applied potential: +6 KV
$V_o$ = 520 volt
$E_{\frac{1}{2}}$ = 4.1 lux.sec.

The photoreceptor was subjected to development treatment with a developer (toner) to form a visible image, then treated with an alkaline processing aqueous solution (e.g. a solution containing 3% of triethanolamine, 10% of ammonium carbonate, 15% of polyethylene glycol having an average molecular weight of 190-210 and 5% of benzyl alcohol) to dissolve the photosensitive layer in non-image areas and washed with water containing sodium silicate to obtain a printing plate.

Offset printing was carried out using this printing plate to find that this printing plate was able to stand printing of about 100,000 copies.

The optimum amount of exposure to obtain the visible toner images was 150 lux.sec (light source: halogen lamp). The printing plate was directly made without using a block copy.

Examples 10-11

On an aluminum plate was formed an intermediate layer, 0.1 μ thick, of diallyl phthalate resin (DAISODAP B supplied by Osaka Soda Co.) and a carrier generating layer, 0.5 μ in dry thickness, was formed thereon by coating on the intermediate layer a dispersion prepared by adding 2 g of an azo pigment to a solution comprising 2 g of polyarylene resin dissolved in 100 ml of tetrahydrofuran and dispersing in a paint conditioner for about 3 hours and drying the coating. A carrier transfer layer, 15 μ in dry thickness, was formed thereon by coating on the carrier generating layer a solution comprising 10 g of a carrier transfer material represented by the following formula:

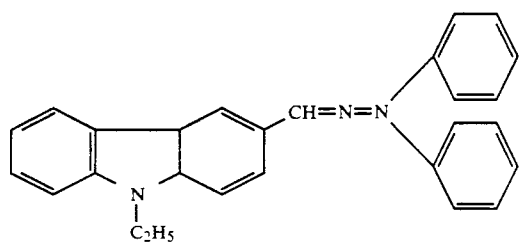

and 12 g of polyacrylate resin dissolved in 100 ml of 1,2-dichlorethane and drying the coating to obtain a drum-type electrophotographic photoreceptor.

Two photoreceptors were produced using the aforementioned pigment Nos. I-105 and I-112 as the azo pigments.

These photoreceptors were left to stand in the dark place at 30° C. for one day and thereafter was mounted on an electrostatic paper testing apparatus (SP-428 of Kawaguchi Denki Seisakusho Co.) and tested for characteristics in the following manner.

That is, the photosensitive layer was electrostatically charged by subjecting it for 5 seconds to corona discharge produced by applying a potential of $-6$ KV from a charger and the surface potential $V_o$ ($-V$) at that time and a surface potential $V_d$ ($-V$) after lapse of 10 seconds were measured and $DD = V_d/V_o \times 100(\%)$ was obtained. The charged surface was exposed to a halogen lamp, the illuminance on the surface being 30 lux, and the exposure $E_{\frac{1}{2}}$ (lux.sec) required for decaying the surface potential to $\frac{1}{2}$ was obtained. Then, this photoreceptor was exposed to fluorescent lamp of 5000 lux for 5 minutes and, after left to stand in the dark place for 30 seconds, was tested for the characteristics in the same manner as above to obtain $V_o$ ($-V$), $E_{\frac{1}{2}}$ (lux.sec) and DD (%). The results are shown in Table 3.

The initial characteristics are shown in the upper column and the characteristics after exposure to light are shown in the lower column in Table 3.

TABLE 3

|  | Azo pigment | $V_o$ ($-V$) | $E_{2/1}$ (lux · sec) | DD (%) |
|---|---|---|---|---|
| Example 10 | I-105 | 1010 | 1.7 | 92 |
|  |  | 820 | 1.2 | 84 |
| Example 11 | I-112 | 1030 | 1.7 | 93 |
|  |  | 840 | 1.1 | 82 |

The results of Table 3 show that photoreceptors containing the azo pigment Nos. I-105 and I-112 of this invention are markedly superior in all of surface potential $V_o$, sensitivity and preexposure characteristic.

Then, after having received an exposure of 50 lux.-second, the photoreceptors were tested for the surface potential, namely, residual potential $E_{50}$ ($-V$). Similar test cycle was repeated 500 times. In each cycle, complete removal of the residual potential was performed by exposing to a tungsten lamp for 0.3 second at an illuminance of 300 lux. The results obtained are shown in Table 4. The results show that photoreceptors containing the azo pigment Nos. I-105 and I-112 are also superior in characteristics of repeated use.

TABLE 4

|  |  | First cycle | | | 500th cycle | | |
|---|---|---|---|---|---|---|---|
|  | Azo pigment | $V_o$ ($-V$) | $E_{\frac{1}{2}}$ (lux · sec) | $E_{50}$ ($-V$) | $V_o$ ($-V$) | $E_{\frac{1}{2}}$ (lux · sec) | $E_{50}$ ($-V$) |
| Example 10 | I-105 | 1010 | 1.7 | 0–5 | 1000 | 1.8 | 0–5 |
| Example 11 | I-112 | 1030 | 1.7 | 0–5 | 1010 | 1.7 | 0–5 |

Examples 12–17

An aluminum drum of 60 mm in diameter was provided on the exterior surface with an intermediate layer, 0.05 $\mu$ in thickness, comprising a vinyl chloride-maleic anhydride copolymer (ESUREK MF-10 of Sekisui Chemical Co.). A carrier generating layer, 0.3 $\mu$ in dry thickness, was formed by coating said intermediate layer with an azo pigment dispersion prepared by adding 2 g of an azo pigment and 1 g of butyral resin (ESUREK B of Sekisui Chemical Co.) to 100 ml of tetrahydrofuran and dispersing in a paint conditioner for about 1 hour, and drying the coating. A carrier transfer layer, 19 $\mu$ in dry thickness, was formed by overcoating said carrier generating layer with a solution prepared by dissolving 5 g of N,N-dibenzylamino-benzaldehyde-1,1-diphenylhydrazone, a carrier transfer material and 7 g of polyarylate resin in 50 ml of 1,2-dichloroethane and drying the coating. Thus, electrophotographic photoreceptor was obtained.

In this way, 6 electrophotographic photoreceptors were prepared by using the aforementioned pigment Nos. I-107, I-109, I-113, I-115, I-119 and I-120.

These photoreceptors were mounted on a commercial electrophotographic copier of cartridge type which had been partially modified by us and reproduction of an original including red images was carried out to obtain a copy which was good in reproducibility of the red images.

The photoreceptors were tested for pre-exposure characteristics and repeated copying ability of 1000 times to find that the photoreceptors of this invention were superior in these characteristics.

Example 18

Example 1 was repeated except that pigment No. I-77 was used in place of I-12. The results are shown in Table 5.

TABLE 5

|  | 1st cycle | 500th cycle |
|---|---|---|
| $V_o$ ($-V$) | 970 | 940 |
| $E_{\frac{1}{2}}$ (lux · second) | 1.8 | 1.7 |
| $E_{50}$ ($-V$) | 0–5 | about 10 |

Examples 19–23

Five electrophotographic photoreceptors of this invention were prepared in the same manner as in Example 1 except that the aforementioned azo pigment Nos. I-66, I-78, I-83, I-84 and II-95 were used as carrier generating materials. They were tested for characteristics in the same manner as in Example 1. The results are shown in Table 6.

TABLE 6

|  |  | First cycle | | | 500th cycle | | |
|---|---|---|---|---|---|---|---|
| Example | Azo pigments | $V_o$ ($-V$) | $E_{\frac{1}{2}}$ (lux · sec) | $E_{50}$ ($-V$) | $V_o$ ($-V$) | $E_{\frac{1}{2}}$ (lux · sec) | $E_{50}$ ($-V$) |
| 19 | Pigment No. I-66 | 960 | 2.5 | about 15 | 950 | 2.4 | about 20 |

TABLE 6-continued

| Example | Azo pigments | First cycle $V_o$ (−V) | First cycle $E_{\frac{1}{2}}$ (lux·sec) | First cycle $E_{50}$ (−V) | 500th cycle $V_o$ (−V) | 500th cycle $E_{\frac{1}{2}}$ (lux·sec) | 500th cycle $E_{50}$ (−V) |
|---|---|---|---|---|---|---|---|
| 20 | Pigment No. I-78 | 1020 | 1.9 | 0–5 | 1010 | 1.9 | 0–5 |
| 21 | Pigment No. I-83 | 1000 | 1.8 | 0–5 | 1000 | 1.8 | 0–5 |
| 22 | Pigment No. I-84 | 980 | 2.1 | 5–10 | 980 | 2.0 | about 10 |
| 23 | Pigment No. II-95 | 970 | 2.8 | about 20 | 940 | 2.7 | about 30 |

Example 24

Example 1 was repeated except that No. II-4 was used as an azo pigment. The results are shown in Table 7.

TABLE 7

|  | 1st cycle | 500th cycle |
|---|---|---|
| $V_o$ (−V) | 780 | 760 |
| $E_{\frac{1}{2}}$ (lux · second) | 1.8 | 1.7 |
| $E_{50}$ (−V) | about 5 | 0 |

Examples 25–29

Five electrophotographic photoreceptors of this invention were prepared in the same manner as in Example except that the azo pigment Nos. II-2, II-6, II-15, II-18 and II-51 were used as carrier generating materials and these were tested for characteristics in the same manner. The results are shown in Table 8.

TABLE 8

| Example | Azo pigment | First cycle $V_o$ (−V) | First cycle $E_{\frac{1}{2}}$ (lux·sec) | First cycle $E_{50}$ (−V) | 500th cycle $V_o$ (−V) | 500th cycle $E_{\frac{1}{2}}$ (lux·sec) | 500th cycle $E_{50}$ (−V) |
|---|---|---|---|---|---|---|---|
| 25 | Pigment No. II-2 | 960 | 2.8 | about 10 | 940 | 2.7 | 0 |
| 26 | Pigment No. II-6 | 1080 | 2.7 | about 10 | 1040 | 2.6 | 0 |
| 27 | Pigment No. II-15 | 1040 | 1.9 | about 0–5 | 1000 | 1.9 | 0 |
| 28 | Pigment No. II-18 | 1010 | 2.1 | about 5 | 990 | 2.0 | 0 |
| 29 | Pigment No. II-51 | 980 | 1.9 | about 0–5 | 940 | 1.9 | 0 |

Example 30

An aluminum drum of 60 mm in diameter was provided on the exterior surface with an intermediate layer, 0.1 μ in thickness, comprising a butyral resin (polymerization degree about 700, Wako Junyaku Co.). A carrier generating layer, 0.5 μ in dry thickness, was formed by coating said intermediate layer with a dispersion prepared by adding 2 g of the aforementioned azo pigment No. II-10 to 100 ml of tetrahydrofuran containing 2 g of polyarylate resin dissolved therein and dispersing in a paint conditioner for about 3 hours, and drying the coating. A carrier transfer layer, 15 μ in dry thickness, was formed by overcoating said carrier generating layer with a solution prepared by dissolving 10 g of N,N-diethylaminobenzaldehyde-1-(4'-methoxyphenyl)-1-allylhydrazone, a carrier transfer material of the structural formula:

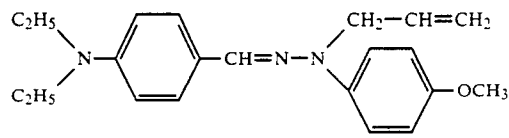

and 12 g of polycarbonate resin (Panlite L-1250 of Teijin Ltd.) in 100 ml of 1,2-dichloroethane and drying the coating. Thus, drum-type electrophotographic photoreceptor was obtained.

This photoreceptor was mounted on a commercial electrophotographic copier of cartridge type which had been partially modified by us and reproduction was carried out to obtain an visible image high in contrast and faithful to original.

Reproduction was repeated 1000 times to obtain visible image remained throughout the same in quality.

Example 31

The drum-type photoreceptor obtained in Example 30 was examined for reflection spectrum by means of an integrating sphere spectrophotometer UV-365 of Shimadzu Seisakusho Ltd.) to find that absorption maxima of this photoreceptor in visible region was at 640 nm and 670 nm. The spectral sensitivities at 640 nm and 670 nm were measured as energy required for decay from −600 V to −100 V to obtain 5.4 erg/cm² and 5.8 erg/cm², respectively. This indicates that the photoreceptor is able to endure actual use under exposure to a light source such as light-emitting diode or He-Ne laser beam.

What is claimed is:

1. An electrophotographic photoreceptor which comprises an electroconductive support and, provided thereon, a photosensitive layer containing an azo pigment represented by the following formula (I):

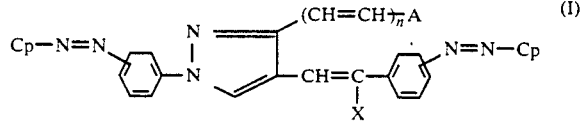
(I)

wherein A is selected from the group consisting of a hydrogen atom, an alkyl group or a heterocyclic ring group, an n is 0 or 1, X is selected from the group consisting of a hydrogen atom, a lower alkyl group, a cyano group or a halogen atom and Cp is a coupler residue.

2. An electrophotographic photoreceptor according to claim 1, wherein the azo pigment represented by the formula (I) is a pigment represented by the formula:

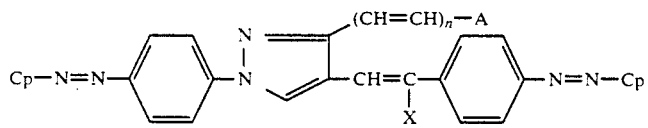

wherein A is selected from the group consisting of a hydrogen atom, an alkyl group or a heterocyclic ring group, n is 0 or 1, X is selected from the group consisting of a hydrogen atom, a lower alkyl group, a cyano group or a halogen atom and Cp is a coupler residue.

3. An electrophotographic photoreceptor according to claim 1, wherein the azo pigment represented by the formula (I) is a pigment represented by the formula:

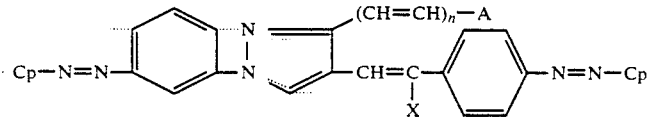

wherein A is selected from the group consisting of a hydrogen atom, an alkyl group or a heterocyclic ring group, n is 0 or 1, X is selected from the group consist-ing of a hydrogen atom, a lower alkyl group, a cyano group or a halogen atom and Cp is a coupler residue.

4. An electrophotographic photoreceptor according to claim 1, wherein the photosensitive layer contains the azo pigment and a charge transfer material.

5. An electrophotographic photoreceptor which comprises an electroconductive support and provided thereon, a photosensitive layer containing an azo pigment represented by the following formula (II):

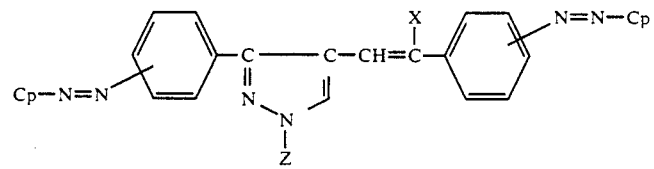

wherein Z is selected from the group consisting of an alkyl group, a phenyl group, or a heterocyclic ring group, X is selected from the group consisting of a hydrogen atom, a lower alkyl group, a cyano group or a halogen atom and Cp represents a coupler residue.

6. An electrophotographic photoreceptor according to claim 5, wherein the azo pigment represented by the formula (II) is a pigment represented by the formula:

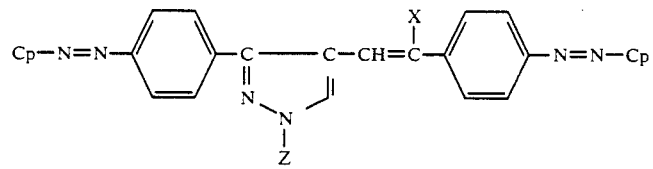

wherein Z is selected from the group consisting of an alkyl group, a phenyl group, or a heterocyclic ring group, X is selected from the group consisting of a hydrogen atom, a lower alkyl group, a cyano group or a halogen atom and Cp represents a coupler residue.

7. An electrophotographic photoreceptor according to claim 5, wherein the azo pigment represented by the formula (II) is a pigment represented by the formula:

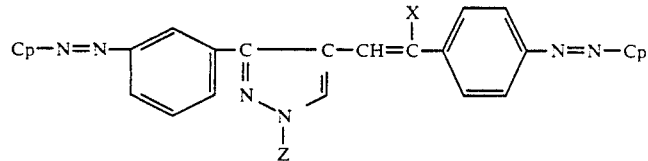

wherein Z is selected from the group consisting of an alkyl group, a phenyl group or a heterocyclic ring group, X is selected from the group consisting of a hydrogen atom, a lower alkyl group, a cyano group or a halogen atom and Cp represents a coupler residue.

8. An electrophotographic photoreceptor according to claim 5, wherein the photosensitive layer contains the azo pigment and a charge transfer material.

9. An electrophotographic photoreceptor according to claim 5 wherein the photosensitive layer comprises a dispersion of the azo pigment in binder.

10. An electrophotographic photoreceptor according to claim 5 wherein the photosensitive layer comprises a charge generating layer containing the azo pigment as a charge generating material and a charge transfer layer containing a charge transfer material.

11. An electrophotographic photoreceptor which comprises an electroconductive support and, provided thereon, a photosensitive layer containing an azo pigment represented by the following formula (I):

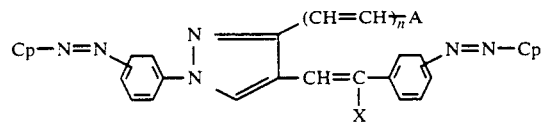
(I)

wherein A is selected from the group consisting of a hydrogen atom, an alkyl group, a phenyl group or a heterocyclic ring group, and n is 0 or 1, X is selected from the group consisting of a lower alkyl group, a cyano group or a halogen atom and Cp is a coupler residue.

12. An electrophotographic photoreceptor according to claim 11, wherein the azo pigment represented by the formula (I) is a pigment represented by the formula:

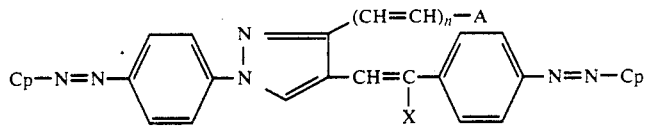

wherein A is selected from the group consisting of a hydrogen atom, an alkyl group, a phenyl group or a heterocyclic ring group, n is 0 or 1, X is selected from the group consisting of a lower alkyl group, a cyano group or a halogen atom and Cp is a coupler residue.

13. An electrophotographic photoreceptor according to claim 11, wherein the azo pigment represented by the formula (I) is a pigment represented by the formula:

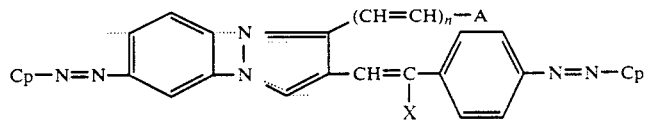

wherein A is selected from the group consisting of a hydrogen atom an alkyl group, a phenyl group or a heterocyclic ring group, n is 0 or 1, X is selected from the group consisting of a lower alkyl group, a cyano group or a halogen atom and Cp is a coupler residue.

14. An electrophotographic photoreceptor according to claim 11, wherein the photosensitive layer contains the azo pigment and a charge transfer material.

15. An electrophotographic photoreceptor according to claim 1 wherein the photosensitive layer comprises a dispersion of the azo pigment in a binder.

16. An electrophotographic photoreceptor according to claim 1 wherein the photosensitive layer comprises a charge generating layer containing the azo pigment as a charge generating material and a charge transfer layer containing a charge transfer material.

* * * * *